United States Patent
Racz

(10) Patent No.: US 11,042,826 B2
(45) Date of Patent: *Jun. 22, 2021

(54) METHOD AND SYSTEM FOR VIRAL IDENTIFICATION OF EVACUEES

(71) Applicant: GENETEC INC., St-Laurent (CA)

(72) Inventor: Pierre Racz, Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/659,846

(22) Filed: Oct. 22, 2019

(65) Prior Publication Data

US 2020/0160256 A1 May 21, 2020

Related U.S. Application Data

(63) Continuation of application No. 16/064,301, filed as application No. PCT/CA2016/051031 on Aug. 31, 2016, now Pat. No. 10,489,737.

(Continued)

(51) Int. Cl.
*G06Q 10/08* (2012.01)
*G07C 11/00* (2006.01)
(Continued)

(52) U.S. Cl.
CPC .............. *G06Q 10/08* (2013.01); *G06Q 10/00* (2013.01); *G06Q 10/06311* (2013.01);
(Continued)

(58) Field of Classification Search
CPC .................................. G01C 21/20; A62B 99/00
See application file for complete search history.

(56) References Cited

U.S. PATENT DOCUMENTS 6,275,707 B1 8/2001 Reed et al.
7,181,228 B2 2/2007 Boesch
(Continued)

FOREIGN PATENT DOCUMENTS

CN 203261480 U 10/2013
CN 103780703 B 1/2017
(Continued)

OTHER PUBLICATIONS

Kanjo, Eiman, Elizabeth Platzer, and Christian Kittl. "Viral Message Passing Framework for Crowd and Sensor Applications." Networked Digital Technologies. Springer Berlin Heidelberg, 2012. 24-33.

(Continued)

*Primary Examiner* — Fabricio R Murillo Garcia
(74) *Attorney, Agent, or Firm* — Anglehart et al.

(57) ABSTRACT

A method and system for viral identification of evacuees are provided. The method is recursive and involves bringing an emergency warden and a midstream evacuee in close proximity with one another to enable a handheld computing device belonging to one of the two to read information from the other, enabling the handheld computing device to read the information, having the handheld computing device read the information to enable an identification of the midstream evacuee, providing the identifier of the midstream evacuee to a central mustering server, whereby the midstream evacuee is enabled to act as an emergency warden, and performing the method with the midstream evacuee acting as an emergency warden with respect to another evacuee before the central mustering server. The method provides the advantage of virally identifying evacuees within the confines of a muster point in an efficient and reliable manner.

20 Claims, 11 Drawing Sheets

Related U.S. Application Data

(60) Provisional application No. 62/270,322, filed on Dec. 21, 2015.

(51) Int. Cl.

| | |
|---|---|
| *H04W 4/90* | (2018.01) |
| *G06Q 10/00* | (2012.01) |
| *H04W 4/02* | (2018.01) |
| *G06Q 90/00* | (2006.01) |
| *G06Q 50/26* | (2012.01) |
| *G06Q 10/06* | (2012.01) |
| *H04W 4/029* | (2018.01) |
| *H04W 4/14* | (2009.01) |
| *H04W 4/80* | (2018.01) |

(52) U.S. Cl.
CPC .......... *G06Q 50/265* (2013.01); *G06Q 90/20* (2013.01); *G06Q 90/205* (2013.01); *G07C 11/00* (2013.01); *H04W 4/023* (2013.01); *H04W 4/029* (2018.02); *H04W 4/90* (2018.02); *G07C 2011/04* (2013.01); *H04W 4/14* (2013.01); *H04W 4/80* (2018.02)

(56) References Cited

U.S. PATENT DOCUMENTS

| | | | |
|---|---|---|---|
| 7,660,872 B2 | 2/2010 | Delia et al. | |
| 7,916,024 B2 | 3/2011 | Gennard | |
| 8,037,202 B2 | 11/2011 | Yeager et al. | |
| 8,215,546 B2 | 7/2012 | Lin et al. | |
| 8,332,063 B2 | 12/2012 | Moshier | |
| 8,417,264 B1 | 4/2013 | Whitney et al. | |
| 8,487,762 B1 | 7/2013 | McMullen et al. | |
| 8,554,283 B1 | 10/2013 | Behbehani | |
| 8,624,727 B2 | 1/2014 | Saigh et al. | |
| 8,774,851 B2 | 7/2014 | Mirbaha et al. | |
| 8,838,477 B2 | 9/2014 | Moshfeghi | |
| 8,907,763 B2 | 12/2014 | Pineau et al. | |
| 8,912,879 B2 | 12/2014 | Fyke et al. | |
| 8,970,367 B2 | 3/2015 | Meraz | |
| 9,026,138 B2 | 5/2015 | Do et al. | |
| 9,125,004 B2 | 9/2015 | Kamal et al. | |
| 9,154,916 B2 | 10/2015 | Lerner et al. | |
| 9,301,119 B2 | 3/2016 | Alazraki et al. | |
| 2003/0018744 A1 | 1/2003 | Johanson et al. | |
| 2006/0118636 A1* | 6/2006 | Miles | G01C 21/206 235/472.01 |
| 2006/0193262 A1 | 8/2006 | McSheffrey et al. | |
| 2008/0129467 A1 | 6/2008 | Gennard | |
| 2008/0153509 A1 | 6/2008 | Piekarski | |
| 2010/0282839 A1 | 11/2010 | Zura et al. | |
| 2011/0136463 A1* | 6/2011 | Ebdon | G08B 7/066 455/404.1 |
| 2011/0199917 A1 | 8/2011 | Karaoguz et al. | |
| 2011/0244798 A1 | 10/2011 | Daigle et al. | |
| 2012/0110568 A1 | 5/2012 | Abel et al. | |
| 2014/0051407 A1 | 2/2014 | Ahearn et al. | |
| 2014/0155086 A1 | 6/2014 | Bhatia | |
| 2014/0179259 A1 | 6/2014 | Liu | |
| 2014/0274111 A1 | 9/2014 | Edge et al. | |
| 2015/0163312 A1 | 6/2015 | Maguire et al. | |
| 2015/0228183 A1* | 8/2015 | Rothkopf | G08B 25/10 340/539.1 |
| 2015/0248824 A1 | 9/2015 | Kamalakannan et al. | |
| 2015/0301815 A1 | 10/2015 | Tervo et al. | |
| 2016/0078756 A1 | 3/2016 | Basalamah | |

FOREIGN PATENT DOCUMENTS

| | | |
|---|---|---|
| WO | 2007/019611 A1 | 2/2007 |
| WO | 2011/106529 A2 | 9/2011 |
| WO | 2013/116756 A1 | 8/2013 |

OTHER PUBLICATIONS

Kanjo, Eiman. "Tools and architectural support for mobile phones based crowd control systems." Network Protocols and Algorithms 4.3 (2012): 4-14.

Ma, Huadong, Dong Zhao, and Peiyan Yuan. "Opportunities in mobile crowd sensing." Communications Magazine, IEEE 52.8 (2014): 29-35.

PCT/CA2016/051031 International Preliminary Report on Patentability Chapter I dated Jun. 26, 2018.

PCT/CA2016/051031 International Search Report dated Oct. 26, 2016.

PCT/CA2016/051031 Search Strategy dated Oct. 26, 2016.

Tseng, Yu-Chee, et al. "Location awareness in ad hoc wireless mobile networks." Computer 34.6 (2001): 46-52.

PCT/CA2016/051031 Written Opinion of the International Searching Authority dated Oct. 26, 2016.

* cited by examiner

METHOD AND SYSTEM FOR VIRAL IDENTIFICATION OF EVACUEES

TECHNICAL FIELD

The present invention relates to emergency evacuation tools, and more specifically, to methods and systems for identifying evacuees.

BACKGROUND

When the alarm sounds and people must evacuate a building, the first priority is to make sure that everyone was able to get out as fast as possible. The usual fire drill procedure is to evacuate the people to a suitable muster point where a fire warden conducts a roll call and checks the name of the ones present against a list of the building occupants expected to be seen at that muster point. The list should preferably be provided to the search and rescue services upon their arrival for assistance in their onsite operations.

Pen and paper mustering solutions require that emergency wardens conduct roll calls before noisy crowds and manually produce attendance reports to be consulted by the fire and rescue services upon their arrival on site. Such solutions are impractical and lengthy, especially in cases of larger evacuations, and as a result, the reports are rarely produced in a timely manner.

Common electronic solutions involve a laptop that keeps an up-to-date list of all occupants, coupled with handheld card readers used to scan the badges of the evacuees. A peer-to-peer wireless network is established between the laptop and the card readers so that as cards are being read, the laptop user is presented with seen/not-seen feedback. If no wireless network can be used, the handheld devices can collect the card reads, which can then be synchronized back to the laptop using a USB cable. Since this solution requires that every badge be scanned, and since handheld card readers can read seven to eight cards per minute, it can become unpractical when the number of occupants increases.

Electronic mustering solutions used within war zones can be adapted for use within the context of evacuations for expeditious mustering. Such solutions consist in mobile applications that enable survivors to report themselves before relevant authorities using Wi-Fi or SMS technologies. However, if the aforementioned mobile applications were adapted for use within the context of evacuations, the reports that they would produce would be unreliable; not only would a building occupant be able to report from within the building, but also, someone can use a building occupant's device to issue a false report.

SUMMARY

It has been found that in a method of mustering evacuees, the steps of bringing an emergency warden and a midstream evacuee in close proximity with one another to enable a handheld computing device belonging to one of the two to read information from the other, enabling the handheld computing device to read the information, having the handheld computing device read the information to enable an identification of the midstream evacuee, providing the identifier of the midstream evacuee to a central mustering server, whereby the midstream evacuee is enabled to act as an emergency warden, and performing the method in a recursive manner with the midstream evacuee acting as an emergency warden with respect to another evacuee provide the advantage of virally identifying evacuees within the confines of a muster point in an efficient and reliable manner.

According to a first embodiment of the present invention there is provided a method of virally identifying evacuees at a muster point within the context of an emergency evacuation, the recursive method comprising: bringing an emergency warden and a midstream one of the evacuees in close proximity with one another to enable a handheld computing device of one of the emergency warden and midstream evacuee to read information from another one of the emergency warden and midstream evacuee; enabling the handheld computing device to read the information; reading the information by the handheld computing device to enable an identification of the midstream evacuee before a central mustering server; providing an identifier of the midstream evacuee to the central mustering server, whereby the midstream evacuee is enabled to act as the emergency warden with respect to another one of the evacuees; and performing the recursive method wherein the midstream evacuee acts as the emergency warden and the another evacuee acts as the midstream evacuee whereby the evacuees are virally identified within the confines of the muster point in an efficient and reliable manner.

It has also been found that in a computer readable medium having stored thereon a mobile application to be executed within the context of an emergency evacuation at a muster point by evacuees on their handheld computing devices, the mobile application, when executed by a midstream one of the evacuees on a midstream one of the handheld computing devices, causing the device's processor to conduct a first transfer of information with an emergency warden to enable a first communication process by which the midstream evacuee is identified before a central mustering server, further requiring that the emergency warden and the midstream evacuee be brought in close proximity with one another to enable the first transfer of information, further causing the device's processor to conduct a second transfer of information with a downstream evacuee after the first transfer of information to enable a second communication process by which the downstream evacuee is identified before the central mustering server, the second exchange of information being enabled by bringing the midstream evacuee and the downstream evacuee in close proximity with one another; and further causing the processor to initiate at least one of the enabled first communication process and enabled second communication process provides the advantage of virally identifying evacuees within the confines of the muster point in an efficient and reliable manner.

According to another aspect of the present invention, there is provided a computer readable medium having stored thereon a mobile application to be executed within the context of an emergency evacuation at a muster point by evacuees on their handheld computing devices, the mobile application, when executed by a midstream one of the evacuees on a midstream one of the handheld computing devices, causes the midstream handheld computing device's processor to: conduct a first transfer of information with an emergency warden to enable a first communication process by which the midstream evacuee is identified before a central mustering server, the first transfer of information being enabled by bringing the midstream evacuee and the emergency warden in close proximity with one another; conduct a second transfer of information with a downstream one of the evacuees after the first transfer of information to enable a second communication process by which the downstream evacuee is identified before the central mustering server, the second exchange of information being enabled by bringing the midstream evacuee and the downstream evacuee in close proximity with one another; and initiate at least one of the enabled first communication process and the enabled second communication process, whereby the evacuees are virally identified within the confines of the muster point in an efficient and reliable manner.

According to yet another aspect of the present invention, there is provided a mustering system for use within the context of an emergency evacuation, the system comprising: a first computer readable medium having stored thereon a mobile application as characterized in the previous paragraph, and a second computer readable medium having stored thereon a software to be executed on a server, the software, when executed on the server, enables the server as a central mustering server and causes its server processor to produce a list of missing persons for the search and rescue services by removing the midstream evacuee and downstream evacuee from a list of persons to be mustered as they are identified before the central mustering server.

BRIEF DESCRIPTION OF THE DRAWINGS

The invention will be better understood by way of the following detailed description of embodiments of the invention with reference to the appended drawings, in which.

DETAILED DESCRIPTION

The present invention relates to emergency evacuation tools, and more specifically, to methods and systems for identifying evacuees. Emergency procedures require that evacuees meet at a predetermined muster point located at a safe distance from the area to be evacuated. At the muster point, the evacuees are checked against a list of area occupants to identify and report the missing persons to the search and rescue services. The reporting of missing persons assists the search and rescue services in their onsite operations.

Figure 1:
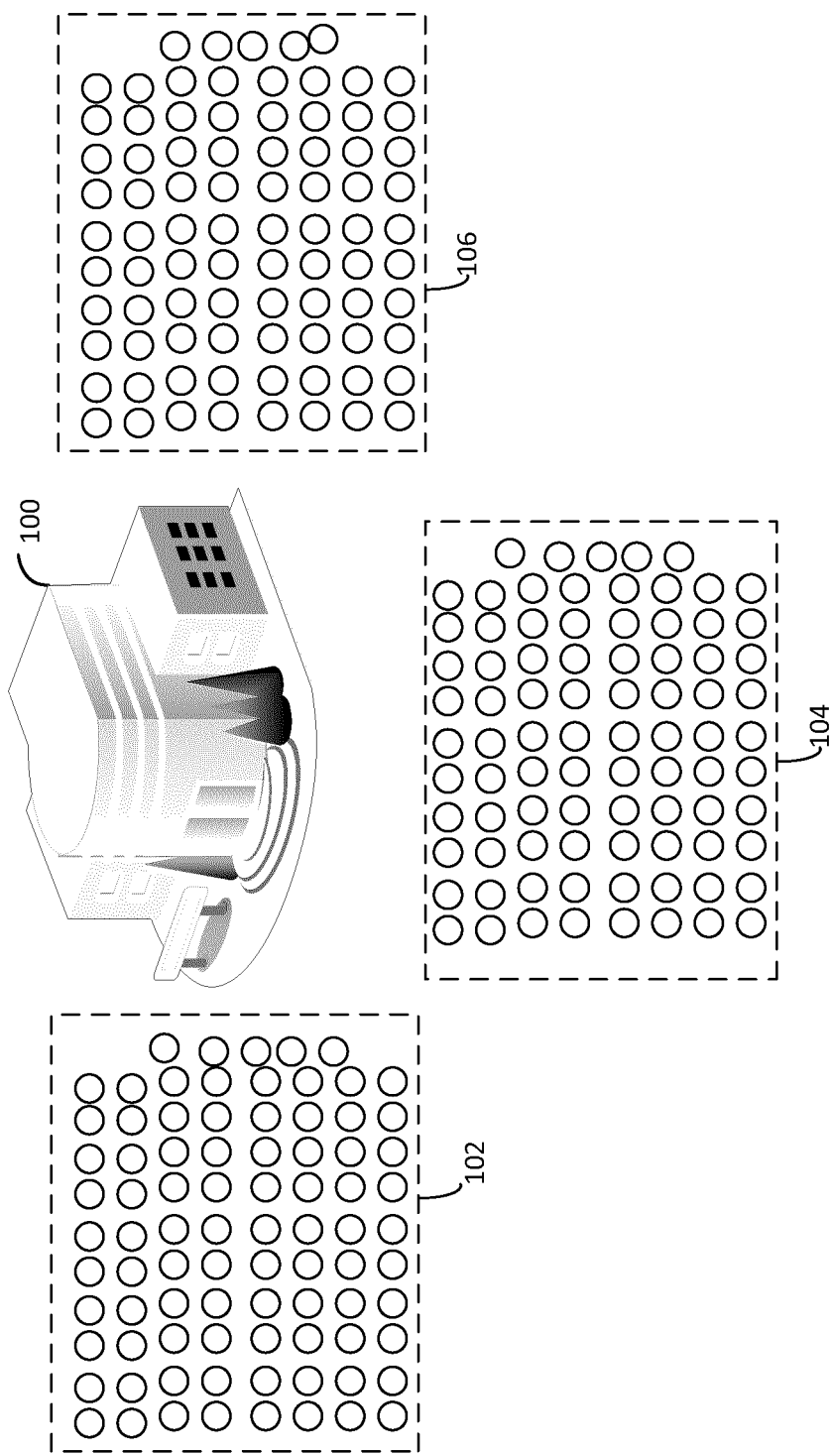
FIG. 1 is a top plan view of an evacuated building and an adjoining area in which evacuees are grouped around three distinct muster points.

In the following, an occupant is a person physically located within a designated area and an evacuee is one that successfully evacuated the designated area. Referring to FIG. 1, there are shown a designated area in the form of a building 100, and three dense groups of evacuees assembled around three distinct muster points, each of which is located at a safe distance from the designated area: a group of evacuees 102, a group of evacuees 104, and a group of evacuees 106.

The method and system of the present invention provide for the identification of the members of the group of evacuees 102, the group of evacuees 104, and the group of evacuees 106 in a viral manner to accelerate the process by which the missing persons are identified and reported to the search and rescue services. As a result, emergency procedures are completed in a timely manner, which reduces costs and risks associated with real and simulated emergencies for all parties involved. The viral nature of the present invention is shown in FIG. 2A to FIG. 2D, each of which is a top plan view of the group of evacuees 102 taken at a different point in time.

Figure 2B:
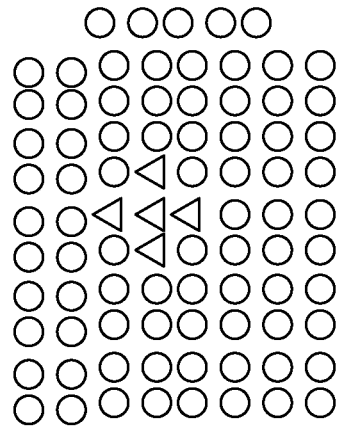
FIG. 2B is a top plan view of the group of evacuees shown in FIG. 2A, the group comprising a root emergency warden and four deputy emergency wardens.
Figure 2D:
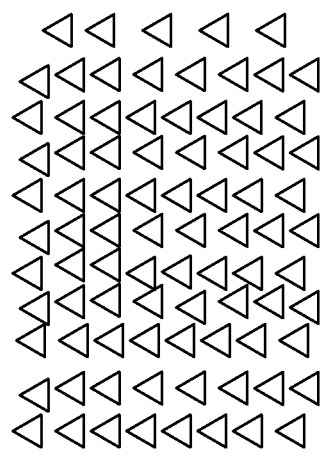
FIG. 2D is a top plan view of the group of evacuees shown in FIG. 2A, the group comprising a root emergency warden and eighty-four deputy emergency wardens.
Figure 2A:
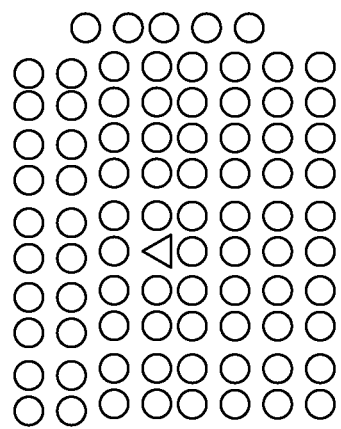
FIG. 2A is a top plan view of one of the groups of evacuees shown in FIG. 1, the group comprising a root emergency warden.

FIG. 2A is a top plan view of the of the group of evacuees 102 taken right after one of its members, a predetermined emergency warden represented by a triangle, launches a mobile application of the present invention on a handheld computing device, thereby initiating a process by which: (a) the predetermined emergency warden is identified before a central mustering server of the present invention; and (b) the handheld computing device is enabled as a mobile mustering station.

FIG. 2B is a top plan view of the of the group of evacuees 102 taken right after the predetermined emergency warden, now a root emergency warden, deputizes four evacuees represented by triangles, thereby establishing a first layer of deputy emergency wardens. In deputizing the four evacuees, the root emergency warden identifies them before the central mustering server and enables their handheld computing devices as mobile mustering stations.

Figure 2C:
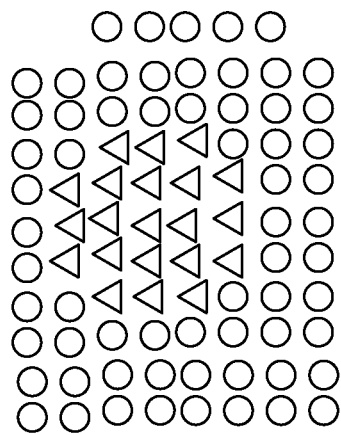
FIG. 2C is a top plan view of the group of evacuees shown in FIG. 2A, the group comprising a root emergency warden and twenty deputy emergency wardens.

FIG. 2C is a top plan view of the of the group of evacuees 102 taken right after each member of the first layer deputizes four other evacuees represented by triangles, thereby establishing a second layer of deputy emergency wardens. In deputizing the sixteen evacuees, the first layer identifies them before the central mustering server and enables their handheld computing devices as mobile mustering stations.

FIG. 2D is a top plan view of the of the group of evacuees 102 taken right after each member of the second layer deputizes four other evacuees represented by triangles, thereby establishing a third layer of deputy emergency wardens. In deputizing the sixty-four evacuees, the second layer identifies them before the central mustering server and enables their handheld computing devices as mobile mustering stations.

FIG. 2A to FIG. 2D clearly illustrate the exponential growth attributable to the viral nature of the present invention as opposed to the linear growth achieved with prior art methods and systems. In FIG. 2A, there is shown no more than one identified evacuee, the predetermined emergency warden, whereas in FIG. 2D, there are shown no less than eighty-five identified evacuees, namely the root emergency warden, the four deputy emergency wardens of the first layer, the sixteen deputy emergency wardens of the second layer, and the sixty-four deputy emergency wardens of the third layer.

According to an embodiment of the present invention, there is provided a mustering system comprising two computer readable media having stored thereon computer programs to be executed on programmable processors. Each one of the computer-readable media can be any computer program product, apparatus, or device such as magnetic discs, optical disks, memory, and programmable logic devices used to provide machine instructions or data to a programmable processor. The computer programs can be any set of machine instructions for a programmable processor and can be implemented in a high-level procedural language, in an objected-oriented language, in assembly or machine language, and in any combination thereof.

The first of the computer readable media has stored thereon a mobile application to be executed by evacuees on their handheld computing devices at a muster point located at a safe distance from the evacuated area. The mobile application, when executed, enables the handheld computing devices to interact with one another, to interact with identification badges, and to capture biometric data such as fingerprints. A first example of an identification badge is a chip embedded in an object such as a smart card and on which is stored an identifier of the evacuee to whom it belongs. Another example of an identification badge is an object on which is printed a code associated with an identifier of the evacuee to whom it belongs. In the latter example, the code can take the form of a QR code, a barcode, a Global Unique Identifier (GUID), or any other machine-readable code. As mentioned previously, the handheld computing device executing the mobile application is enabled to directly interact with evacuees for the purposes of viral identification. The mobile application can be downloaded onto the handheld computing devices on demand from a service provider via an online marketplace such as the App Store™ or Google Play™ or from a server that specifically caters to the area's occupants via the Internet, a local area network, or a wide area network.

The second of the computer readable media has stored thereon a server program to be executed on a remote server located at a safe distance from the designated area. The remote server can be stationary or portable. It can be a ready-made device, such as a smartphone, or one that is specifically designed to execute the server program. The server program, when executed, enables the remote server as a central mustering server that consolidates information provided by the handheld computing devices to produce reports for the search and rescue services.

Figure 3:
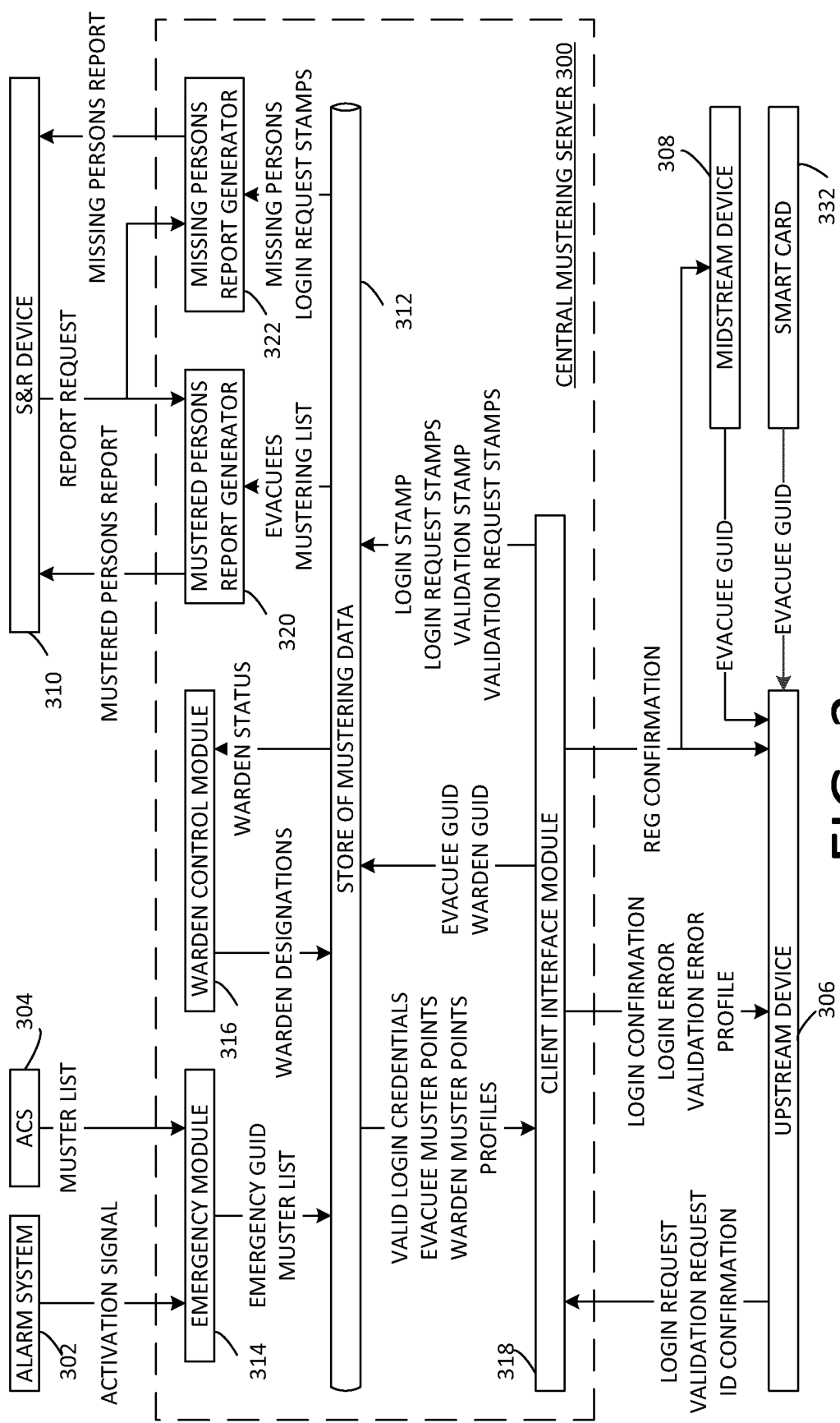
FIG. 3 is a schematic block diagram illustrating a central mustering server.

Referring now to FIG. 3, there is provided a schematic block diagram of a central mustering server 300 according to an embodiment of the present invention. The central mustering server 300 is in communication: with an alarm system 302 to detect emergency evacuations in real-time; with an access control system 304 to identify the occupants of the designated area; with handheld computing devices exemplified by an upstream device 306 and a midstream device 308 to identify evacuees; as well as with a search and rescue device 310 to provide reports listing the evacuees and the missing persons.

The alarm system 302 can be a ready-made system or one that is specifically designed to interact with the central mustering server 300. It can be installed in a closed area such as a residential, commercial, or industrial building, or in an open area such as a theme park or a zoo. It can be triggered automatically by onsite sensors or manually by actuators. When triggered, it emits an audio signal instructing occupants to evacuate the designated area, it provides an activation signal to the central mustering server 300, and it provides an emergency notification to the search and rescue services. A timestamp of the emergency evacuation and the geographical location of the designated area are optionally encoded in the activation signal. In one embodiment, the central mustering server 300 is connected to sensors configured to reliably distinguish the audio signal from ambient noise, and the activation signal consists in the emitted audio signal. In another embodiment, the alarm system 302 provides the emergency notification to the central mustering server 300 as the activation signal. In yet another embodiment, the alarm system 302 provides a distinct, customized activation signal to the central mustering server 300.

The access control system 304 can be a ready-made system or one that is specifically designed to interact with the central mustering server 300. It can be installed in a closed area such as a residential, commercial, or industrial building, or in an open area such as a theme park or a zoo. It can comprise an access control panel in communication with readers positioned at opposite sides of an access point as well as with a barrier mounted at the access point to prevent any intrusions. The access control panel is an electronic system configured to receive identifiers from the readers and to check the received identifiers against an access list. If the identifier belongs to a person on the access list, the access control panel unlocks the barrier and edits the access list to indicate whether the person entered or left the area. Otherwise, the access control panel keeps the barrier locked. The barrier is a physical obstacle such as a locked door preventing an intruder from passing through the access point. The readers are devices such as keypads, smart card readers, and biometric readers configured to read identifiers uniquely associated with persons permitted to access the area. The access control system 304 provides the access list to the central mustering server 300 as a muster list.

The handheld computing devices exemplified by the upstream device 306 and the midstream device 308 can be ready-made devices such as smart phones, tablets, and laptops, or customized ones specifically designed to communicate with one another and with the central mustering server 300. Their weight and dimensions make them easy to carry during emergency evacuations. They are equipped: with a processor capable of executing the mobile application of the present invention; any combination of hardware and software required to communicate with one another over ranges no greater than five meters; and any combination of hardware and software required to communicate with the central mustering server 300. As a first example, the handheld computing devices are equipped with an infrared LED, a diode photo-detector, and an amplifier to communicate with one another using infrared wireless technology. As a second example, the handheld computing devices are equipped with Radio-Frequency Identification (RFID) or Near-Field Communication (NFC) tags and readers to communicate with one another using RFID or NFC technologies. The same technology can be used for reading chips embedded in objects belonging to evacuees, such as smart cards. As a third example, the handheld computing devices are equipped with QR code generators, QR code readers, and cameras of sufficient resolution to capture QR codes to communicate with one another using QR codes. The same technology can be used to capture QR codes printed on an object belonging to an evacuee. The camera can also be used to capture biometric data such as high-resolution images of irises for instance. Alternatively or in addition, the handheld computing device can capture another type of biometric data, fingerprints, through a fingerprint sensor. In order to communicate with the central mustering server 300, the handheld computing devices can be equipped with Wi-Fi modem circuitry. The handheld computing devices communicate with one another to initiate processes by which they are enabled as mobile mustering stations and the evacuees to whom they belong are identified before the central mustering server 300 in a viral manner.

The search and rescue device 310 can be a ready-made device or one specifically designed to communicate with the central mustering server 300. It can be a stationary system installed in the precinct of the search and rescue services and capable of wired or wireless communication with the central mustering server 300. Alternatively, it can be a handheld computing device that search and rescue agents carry with them on site and capable of wireless communication with the central mustering server 300 such as smart phones, tablets, and laptops. The search and rescue device 310 submits requests to the central mustering server 300, which in turn provides one or more reports listing evacuees and missing persons. The reports enable the search and rescue services to determine whether any person has remained in the designated area and needs to be rescued.

The central mustering server 300 has: a store of mustering data 312 configured to consolidate data acquired prior to, during, and following a specific emergency evacuation; an emergency module 314 configured to retrieve or generate emergency-specific data; a warden control module 316 configured to designate substitute emergency wardens; a client interfacing module 318 configured to interact with the handheld computing devices; a mustered persons report generator 320 configured to generate reports listing the identified evacuees; and a missing persons report generator 322 configured to generate reports listing missing persons, wherein both reports are intended to assist the search and rescue services in their onsite operations.

The store of mustering data 312 can be any combination of one or more computer programs and electronic circuits configured to store data. It can be a relational database, a non-relational database, or any other type of structured and persistent memory that enables computer programs to query and edit its content. For instance, it can be a Microsoft® SQL server database. The content of the store of mustering data 312 comprises data pertaining to the designated area itself, to the persons with access to the covered area, to the persons to be mustered, or occupants, and to the evacuees. It comprises the geographical location of the designated area, the name of the area's operator, and the names of the predetermined emergency wardens. For each person having access to the covered area, the content includes the person's name, a headshot, login credentials, and a designated muster point. For each person to be mustered, or occupant, the content includes the person's name and a time of entry into the designated area in the form of a timestamp. For each evacuee, the content comprises the evacuee's name and coordinates, the name of the emergency warden by whom the evacuee was identified before the central mustering server 300, the time at which the evacuee was identified in the form of a timestamp, and the place where the evacuee was identified in the form of a location stamp. The content also includes a GUID assigned to at least some of the aforementioned data items. It is important to note that while the content of the store of mustering data 110 has been described as comprising GUIDs, it can alternatively comprise identifiers of a different type. For instance, if the covered area is a commercial building, employee numbers can be used as identifiers of area occupants.

A GUID is a unique reference number used as an identifier in computer software. The term GUID typically refers to various implementations of the universally unique identifier (UUID) standard. GUIDs are usually stored as 128-bit values, and are commonly displayed as 32 hexadecimal digits with groups separated by hyphens, such as {21EC2020-3AEA-4069-A2DD-08002B30309D}. GUIDs generated from random numbers sometimes contain 6 fixed bits saying they are random and 122 random bits; the total number of unique such GUIDs is $2^{122}$ (approximately 5.3× $10^{36}$). This number is so large that the probability of the same number being generated randomly twice is negligible. However, other GUID versions have different uniqueness properties and probabilities, ranging from guaranteed uniqueness to likely non-uniqueness. Assuming uniform probability for simplicity, the probability of one duplicate would be about 50% if every person on earth as of 2012 owned 600 million GUIDs each.

The emergency module 314 is a combination of one or more computer programs and electronic circuits configured to retrieve or generate emergency-specific data. It is in wired or wireless communication with the alarm system 302, the access control system 304, and the store of mustering data 312. Upon receiving an activation signal from the alarm system 302, the emergency module 314 generates a GUID specific to the emergency evacuation, retrieves a muster list, also referred to as the list of occupants or the list of persons to be mustered, from the access control system 304, and stores the generated GUID and retrieved list in the store of mustering data 312.

The warden control module 316 is a combination of one or more computer programs and electronic circuits configured to designate substitute emergency wardens when necessary. It is in wired or wireless communication with the alarm system 302 and the store of mustering data 312. After receiving an activation signal from the alarm system 302, the warden control module 316 queries the store of mustering data 312 to determine whether any of the predetermined emergency wardens are absent from the designated area. For each absentee, it queries the store of mustering data 312 to identify an occupant sharing the same muster point and designates the identified occupant as a substitute emergency warden before the store of mustering data 312. Furthermore, after a predetermined amount of time elapses from the moment it receives the activation signal, the warden control module 316 queries the store of mustering data 312 to determine whether any of the occupants that are either predetermined emergency wardens or substitute emergency wardens have remained on the muster list. For each missing occupant, it queries the store of mustering data 312 to identify another occupant sharing the same muster point and having logged into the central mustering server 300. If the query returns a hit, the warden control module 316 designates the identified occupant as a substitute emergency warden before the store of mustering data 312. Otherwise, the query is repeated until it returns a hit.

The mustered persons report generator 320 is a combination of one or more computer programs and electronic circuits in wired or wireless communication with the search and rescue device 310 and the store of mustering data 312. It is configured to receive a report request from the search and rescue device 310 and, in response to the received request, to retrieve from the store of mustering data 312 the evacuees' names, the names of the emergency wardens that identified them before the central mustering server 300, as well as the corresponding time and location stamps. From the retrieved data, it produces a report in the form of a tree diagram wherein each node represents an evacuee, and its parent node represents the corresponding emergency warden. The mustered persons report generator 320 transmits the produced report to the search and rescue device 310. While the mustered persons report generator 320 has been described as generating reports in the form of a tree diagram, it can alternatively generate reports presenting the data in a different manner, such as in the form of a map or a chronological list.

The missing persons report generator 322 is a combination of one or more computer programs and electronic circuits in wired or wireless communication with the search and rescue device 310 and the store of mustering data 312. It is configured to receive a report request from the search and rescue device 310 and, in response to the received request, to generate a blank missing persons report, to retrieve from the store of mustering data 312 the names of the persons to be mustered as well as the names of the evacuees, to add the names of the persons to be mustered to the blank missing persons report, and to remove from the missing persons report the names of the evacuees. Subsequently, for each one of the remaining names, it retrieves from the store of mustering data 312 the corresponding profile as well as the person's login time and location stamps, if any, and incorporates the retrieved data into the report to produce a complete version. The missing persons report generator 322 provides the complete version to the search and rescue device 310 in order to assist the search and rescue services in their onsite operations.

Figure 4:
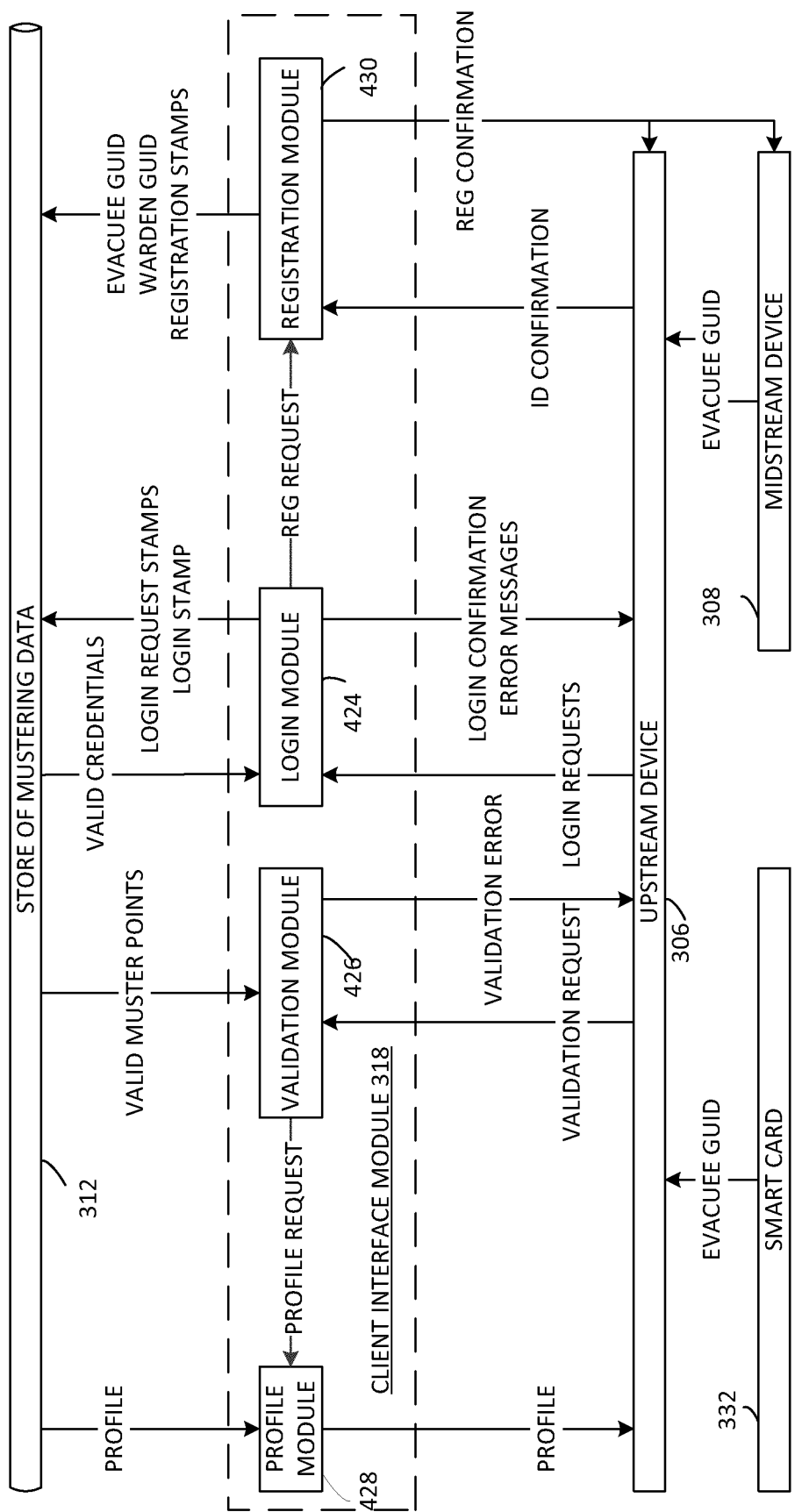
FIG. 4 is a schematic block diagram illustrating a client interface module of the central mustering server shown in FIG. 3.

The client interface module 318 is configured to interact with the handheld computing devices over the course of a communication process by which they are enabled as mobile mustering stations and the evacuees to whom they belong are identified before the central mustering server 300. Referring now to FIG. 4, there is provided a schematic block diagram of the client interface module 318, which has: a login module 424 configured to process requests to log into the central mustering server 300; a registration module 430 configured to process requests to identify an evacuee before the central mustering server 300 and to enable a handheld computing device of the evacuee as a mobile mustering station; a validation module 426 configured to determine whether a specific emergency warden is entitled to identify the evacuee before the central mustering server 300; and a profile module 428 configured to process requests for additional information regarding the evacuee.

The login module 424 is a combination of one or more computer programs and electronic circuits in wired or wireless communication with the handheld computing devices and the store of mustering data 312. It is configured to receive login requests from the handheld computing devices, which requests comprise login credentials, and in response to the received requests, to query the store of mustering data 312 for the login credentials. If the query returns a hit, the login module 424 generates and stores a login timestamp as associated with the corresponding evacuee in the store of mustering data 312. It also provides to the handheld computing device from which the login request was issued a login confirmation. However, if the query fails to return a hit, the login module 424 provides to the handheld computing device from which the login request was issued a login error notification. If the login module 424 recognizes the corresponding evacuee as one of the predetermined emergency wardens or one of the substitute emergency wardens, it provides a registration request to the registration module 430. The login module 424 is preferably capable of handling a sufficiently large number of login requests per unit of time to minimize the likelihood of a system failure, which could slow down the mustering process significantly The validation module 426 is a combination of one or more computer programs and electronic circuits in wired or wireless communication with the handheld computing devices and the store of mustering data 312 to process validation requests. It is configured to receive validation requests from the handheld computing devices, which requests comprise the GUIDs of the emergency wardens as well as the GUIDs of the evacuees in instance of identification, and in response to the received requests, to query the store of mustering data 312 for the received GUIDs in order to determine: whether the received GUIDs are associated to persons sharing a common muster point; whether one of the received GUIDs is associated with an entry on the muster list; and whether the location stamp matches the common muster point, in which case it submits a profile request to the profile module 428. Otherwise, it returns a validation error message to the handheld computing device from which the validation request was issued, the validation error message providing a justification as to the failed validation attempt. More specifically, the validation error message indicates that the validation had been issued either with respect to a person absent from the muster list, with respect to a person that fails to share a common muster point with the emergency warden, or from a location other than the common muster point. The validation error message can also indicate the geographic location of the muster point from which the validation request should have been issued. In some embodiments, the validation requests are stored in the store of mustering data 312 should the evacuees fail to have themselves subsequently identified before the central mustering server 300 in a proper manner.

The profile module 428 is a combination of one or more computer programs and electronic circuits in wired or wireless communication with the handheld computing devices and the store of mustering data 312 to process requests for additional information regarding evacuees in instance of identification. It is configured to receive profile requests from the handheld computing devices, which requests comprise the GUIDs of the evacuees in instance of identification, and in response to the received requests, to retrieve the evacuees' profiles from the store of mustering data 312, and to transfer the retrieved profiles to the handheld computing devices for visual confirmation by the emergency wardens. The profile can, for instance, include the evacuees' full names, the departments to which they belong, and headshots.

The registration module 430 is a combination of one or more computer programs and electronic circuits in wired or wireless communication with the handheld computing devices and the store of mustering data 312 to process the identification of evacuees before the central mustering server 300. It is configured to receive from the handheld computing devices of the emergency wardens confirmations that the GUIDs of the evacuees in instance of registration are indeed the emergency wardens' interlocutors. The confirmations comprise the GUIDs of the emergency wardens as well as the GUIDs of the evacuees in instance of identification. Responsive to the received confirmation, the registration module 430 stores the received GUIDs in the store of mustering data 312, thereby identifying the evacuees and their respective emergency wardens before the central mustering server 300. It also generates and stores registration timestamps within the store of mustering data 312 as associated with the identified evacuees. Furthermore, it provides the handheld computing devices of the evacuees and respective emergency wardens with registration confirmations, or reg confirmations, which confirm the end of the communication process by which the evacuees are identified before the central mustering server 300 and their handheld computing devices are enabled as mobile mustering stations. The registration module 430 is also configured to receive registration requests, or reg request, from the login module 424 with respect to predetermined emergency wardens and substitute emergency wardens that have successfully logged into the central mustering server 300, the registration requests comprising the GUIDs of the corresponding emergency wardens. Responsive to the received registration requests, the registration module 430 stores the received GUIDs in the store of mustering data 312, thereby identifying the corresponding emergency wardens before the central mustering server 300. It is also configured to generate and store registration timestamps within the store of mustering data 312 as associated with the identified emergency wardens and to provide the handheld computing devices from which the login requests had been issued with registration confirmations, namely ones confirming identification before the central mustering server 300 and enablement of the handheld computing devices as mobile mustering stations.

Figure 5:
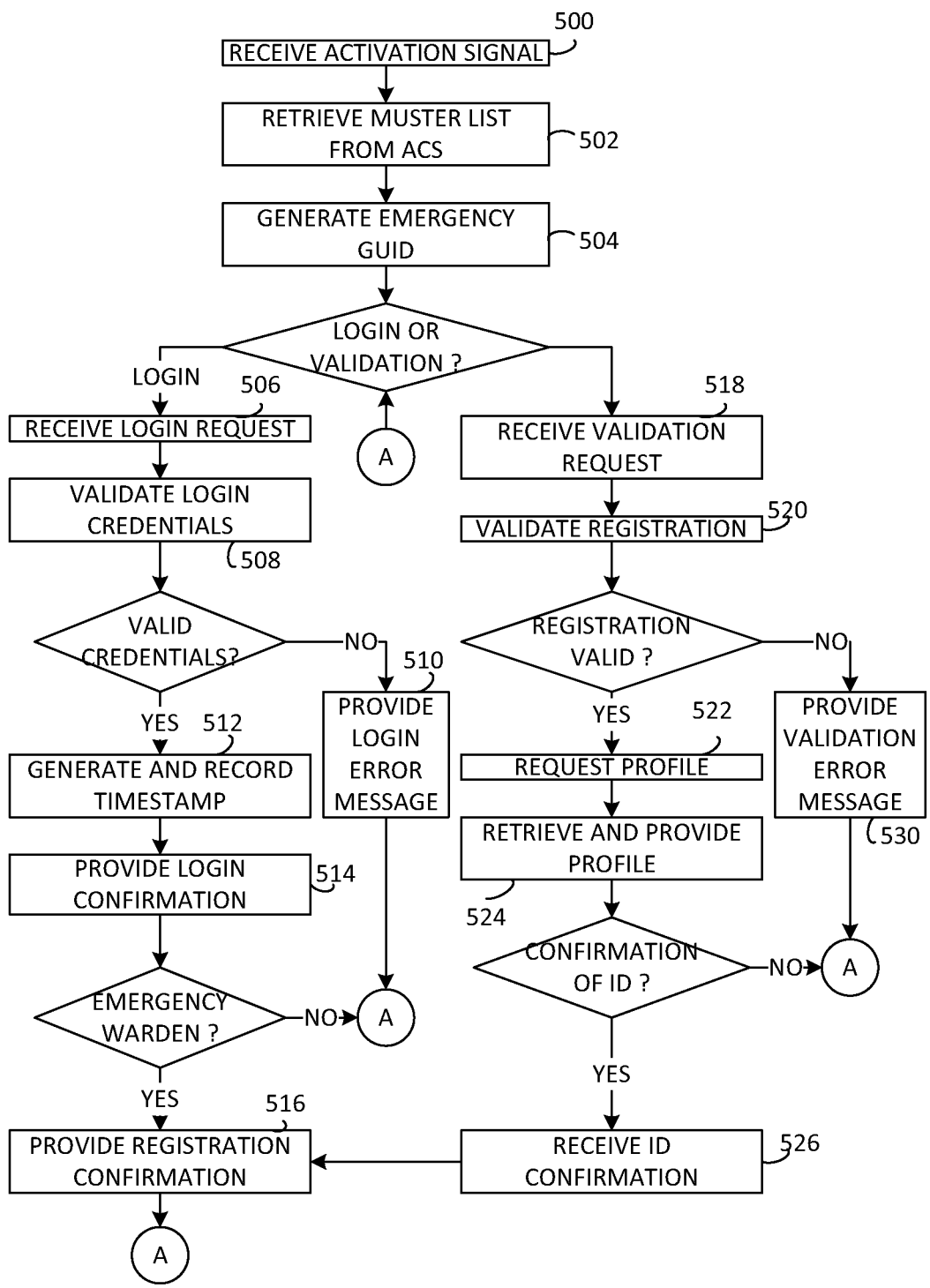
FIG. 5 is a flowchart illustrating the operation of the central mustering server shown in FIG. 3.

As mentioned previously, according to an embodiment of the present invention, there is provided a mustering system comprising two computer readable media, the first of which has stored thereon a server program to be executed on a server. When the server program is executed, it enables the server as the central mustering server 300. The second computer readable medium has stored thereon a mobile application to be executed by the evacuees on their handheld computing devices. The mobile application, when executed, enables each one of the handheld computing devices to communicate with the central mustering server 300. The handheld computing devices are exemplified by the upstream device 306 and the midstream device 308. The operation of the central mustering server 300 in identifying the evacuees in a viral manner according to an embodiment of the present invention is described herein below with reference to FIG. 3, FIG. 4, and FIG. 5.

When the alarm system 302 is triggered, it generates an activation signal. In a step 500, the emergency module 314 is provided with the activation signal through a push or pull mechanism over wired or wireless communication. The activation signal can, for instance, be an audio signal instructing occupants to evacuate the covered area, an emergency notification submitted to the search and rescue services, or another signal designed specifically for the purposes of the central mustering server 300.

In a step 502, the emergency module 314 is provided with a muster list from the access control system 304 through a push or pull mechanism, over wired or wireless communication, and stores the provided muster list in the store of mustering data 312. In some embodiments, the emergency module 314 pulls the muster list from the access control system 304 in response to the activation signal. In other embodiments, the access control system 304 pushes the muster list to the emergency module 314 upon being notified that the alarm system 302 has been triggered. The muster list comprises the occupants' names, GUIDs, and times of entry. The muster list can be provided in the form of a Microsoft Excel™ file, a Microsoft Access™ file, or in any other machine-readable format. The emergency module 314 can store the muster list as provided in the store of mustering data 312, or alternatively, it can adapt the muster list according to the requirements of the store of mustering data 312 beforehand.

In a step 504, the emergency module 314, responsive to the activation signal, generates and stores a GUID specific to the emergency evacuation in the store of mustering data 312. The generated GUID serves the purpose of distinguishing within the store of mustering data 312 any content pertaining to the emergency evacuation from the remaining content. The remaining content of the store of mustering data 312 can, for instance, pertain to previous emergency evacuations. Keeping historical records of emergency evacuations can be useful for the purposes of measuring improvements or identifying weaknesses in implementing emergency procedures.

While the central mustering server 300 is performing the steps 500, 502, and 504, the occupants evacuate the designated area and meet as evacuees at one or more predetermined muster points. If the designated area is of modest capacity, its occupants may be directed to a same muster point. However, designated areas of larger capacity may call for a plurality of muster points, in which case evacuees would be directed to a specific one of the muster points as a function of one or more criterion. For instance, occupants of a residential building may be directed to different muster points as a function of their floor whereas those of a commercial building may be directed to different muster point depending on their employer. In some embodiments, a routing device is installed at the muster point to enable communication between the handheld computing devices and the central mustering server 300 over a Wi-Fi network. The routing device can be enabled by default, or alternatively, enabled only when the alarm system 302 is triggered. As soon as the occupants reach their muster point, they are required to launch the mobile application on their handheld computing devices and submit a login request to the login module 424.

In a step 506, the login module 424 receives a login request issued by the upstream device 306 and transmitted over wired or wireless communication. As mentioned previously, the login request comprises the login credentials as well as the corresponding time and location stamps. The login credentials, which had been previously stored in the store of mustering data 312 as associated with the evacuee, can be in the form of a username and password generated by the evacuee or on behalf of the evacuee. For instance, in cases where the designated area is a commercial building, the credentials may be the same as those used to log into workstations. Alternatively, the login credential may be in the form of biometric data such as fingerprints or iris patterns.

In a step 508, responsive to the login request, the login module 424 validates the login credentials by accessing the store of mustering data 312, in which are stored the login credentials of all persons with access to the designated area. In some embodiments, the login module 424 validates the login credentials by submitting a query, and in others, it sequentially retrieves login credentials from the store of mustering data 312 and checks them against the evacuee's login credentials. If the login request comprises additional details regarding the evacuee such as a residence floor, the login module 424 can use the additional details to narrow down its search within the store of mustering data 312. The login module 424 also determines whether the received login credentials are those of a predetermined or substitute emergency warden.

In a step 510, if the login module 424 determined that the received login credentials are invalid, it returns a login error message for display on the screen of the upstream device 306. In some embodiments, the login error message is generic, and in others, it provides a justification. For instance, the login error message can indicate that the username has been recognized and provide instructions to retrieve the forgotten password. Alternatively, the login error message can indicate that the username has not been recognized and provide instructions to retrieve the username.

In a step 512, if the login module 424 determined that the received login credentials are valid, it generates and stores a login timestamp in the store of mustering data 312 as associated with the evacuee to whom the upstream device 306 belongs, namely the upstream evacuee. In embodiments wherein the login request comprises corresponding time and location stamps generated by the upstream device 306, the login module 424 stores the received stamps in the store of mustering data 312 as associated with the upstream evacuee. The time and location stamps are particularly useful in cases where the upstream evacuee, for one reason or another, fails to subsequently register before the central mustering server 300 as they provide the search and rescue services with additional information as to the upstream evacuee's whereabouts.

In a step 514, and after storing a login timestamp in the store of mustering data 312 as associated with the upstream evacuee, the login module 424 provides a login confirmation for display on the screen of the upstream device 306. The login confirmation informs the upstream evacuee that the login request has been successfully processed and can, in some embodiments, comprise the login timestamp generated by the login module 424. The login process provides for a more reliable mustering process as it decreases the likelihood that handheld computing devices such as the upstream device 306 are in the hands of anyone other than their rightful operators.

In a step 516, if the login module 424 previously determined that the received login credentials are those of a predetermined emergency warden or substitute emergency warden, the upstream evacuee is identified before the central mustering server 300 and provided with a registration confirmation on the upstream device 306. More specifically, the login module 424 submits a registration request, or reg. request, to the registration module 430 on behalf of the upstream evacuee, the registration request comprising the GUM of the upstream evacuee. In response to the registration request, the registration module 430 generates and stores a registration timestamp as associated with the upstream evacuee in the store of mustering data 312, whereby the upstream evacuee is identified before the central mustering server 300. The registration confirmation is provided for display on the upstream device 306 as a notification: that the upstream evacuee has been identified before the central mustering server 300; that the upstream device 306 is enabled as a mobile mustering station; and that as an emergency warden, the upstream evacuee may now identify others before the central mustering server 300.

Following the step 516, the upstream evacuee is entitled to act as an emergency warden with respect to other evacuees within the confines of the muster point by using the upstream device 306 as a mobile mustering station. One such evacuee is referred to herein below as the midstream evacuee, whose handheld computing device is the midstream device 308. The upstream evacuee and the midstream evacuee select a same communication technology to be used by their respective devices for the purposes of transferring information. Thereafter, they bring their respective devices in proximity with one another to enable the information transfer, which can only take place within ranges no greater than five meters. Once the information transfer is enabled and completed, a communication process is initiated to identify the midstream evacuee before the central mustering server 300 and enable the midstream device 308 as a mobile mustering station.

In the embodiment shown in FIG. 3 and FIG. 4, the information transfer consists in the transfer of the midstream evacuee's GUID from the midstream device 308 to the upstream device 306. This information transfer initiates a communication process over the course of which the upstream device 306 submits a validation request to the central mustering server 300.

Referring back to FIG. 5, in a step 518, the validation module 426 is provided with a validation request over wired or wireless communication from the upstream device 306. The validation request comprises the GUID of the upstream evacuee, the GUID of the midstream evacuee, as well as a location stamp generated by the upstream device 306 for the purpose of identifying the geographical location in which the information transfer took place. The validation request serves the purpose of instructing the validation module 426 to determine whether the upstream evacuee is entitled to have the midstream evacuee identified before the store of mustering data 312 at the geographical location in which the information transfer took place. This is because emergency wardens can only operate: within the confines of their muster points; and with respect to evacuees in instance of identification before the central mustering server 300 that were assigned the same muster points.

In a step 520, the validation module 426, responsive to the provided validation request, queries the store of mustering data 312 using the GUID of the upstream evacuee and the GUID of the midstream evacuee to determine: whether the upstream evacuee and midstream evacuee share a common muster point; whether the received location stamp matches the common muster point; and whether the midstream evacuee is on the muster list. If all three criteria are met, the validation module 426 determines that the upstream evacuee, acting as an emergency warden, is indeed entitled to have the midstream evacuee identified before the central mustering server 300 at the geographical location from which the validation request was issued. Otherwise, the validation module 426 determines that the upstream evacuee is not entitled to do so.

In a step 522, if the validation module 426 previously determined that the upstream evacuee is entitled to have the midstream evacuee registered before the store of mustering data 312 at the geographical location in which the information transfer took place, it submits a profile request to the profile module 428. The profile request comprises the GUID of the midstream evacuee and serves the purpose of instructing the central mustering server 300 to provide the upstream evacuee with additional information that may prove useful in confirming that the midstream evacuee is indeed the person holding the midstream device 308. This is particularly useful in situations where emergency wardens are not expected to know all persons assigned to their muster points.

In a step 524, the profile module 428, responsive to the profile request received from the validation module 426, queries the store of mustering data 312 using the GUID of the midstream evacuee to retrieve a corresponding profile, and provides the retrieved profile for display on the screen of the upstream device 306. The profile can, for instance, include the person's full name, the department to which the person belongs, headshots, and any other information that may assist the upstream evacuee in confirming that the midstream evacuee is indeed the person operating the midstream device 308.

After consulting the retrieved profile, if the upstream evacuee is unable to confirm that the midstream evacuee is indeed the person holding the midstream device 308, the upstream evacuee submits a request to cancel the communication process and moves on to another evacuee in instance of registration before the central mustering server 300. Otherwise, the upstream evacuee requests that an ID confirmation be issued. The upstream evacuee can submit any of the two aforementioned requests through the upstream device 306.

In a step 526, if the upstream evacuee previously submitted a request to issue an ID confirmation, the registration module 430 receives the ID confirmation from the upstream device 306. The ID confirmation comprises the GUID of the upstream evacuee as well as the GUID of the midstream evacuee. Responsive to the received ID confirmation, the registration module 430 generates and stores a registration timestamp within the store of mustering data 312 as associated with the midstream evacuee, whereby the midstream evacuee is identified before the central mustering server 300.

In a step 516, the registration module 430 provides a registration confirmation for display on the upstream device 306. The registration confirmation confirms to the upstream evacuee: that the midstream evacuee has been identified before the central mustering server 300; that the midstream device 308 is enabled as a mobile mustering station; and that as an emergency warden, the midstream evacuee may now identify others before the central mustering server 300. In some embodiments, the registration confirmation comprises the registration timestamp generated in the step 526.

In a step 530, if the validation module 426 previously determined that the upstream evacuee is not entitled to identify the midstream evacuee before the central mustering server 312 at the geographical location in which the information transfer took place, it returns a validation error message to the upstream device 306, which validation error message comprises a justification as to the failed validation attempt. More specifically, the validation error message indicates that: the midstream evacuee is absent from the muster list; the midstream evacuee fails to share a common muster point with the upstream evacuee; or the information transfer took place outside the boundaries of the common muster point, in which case it can provide an indication as to the geographical location of the boundaries.

Figure 6:
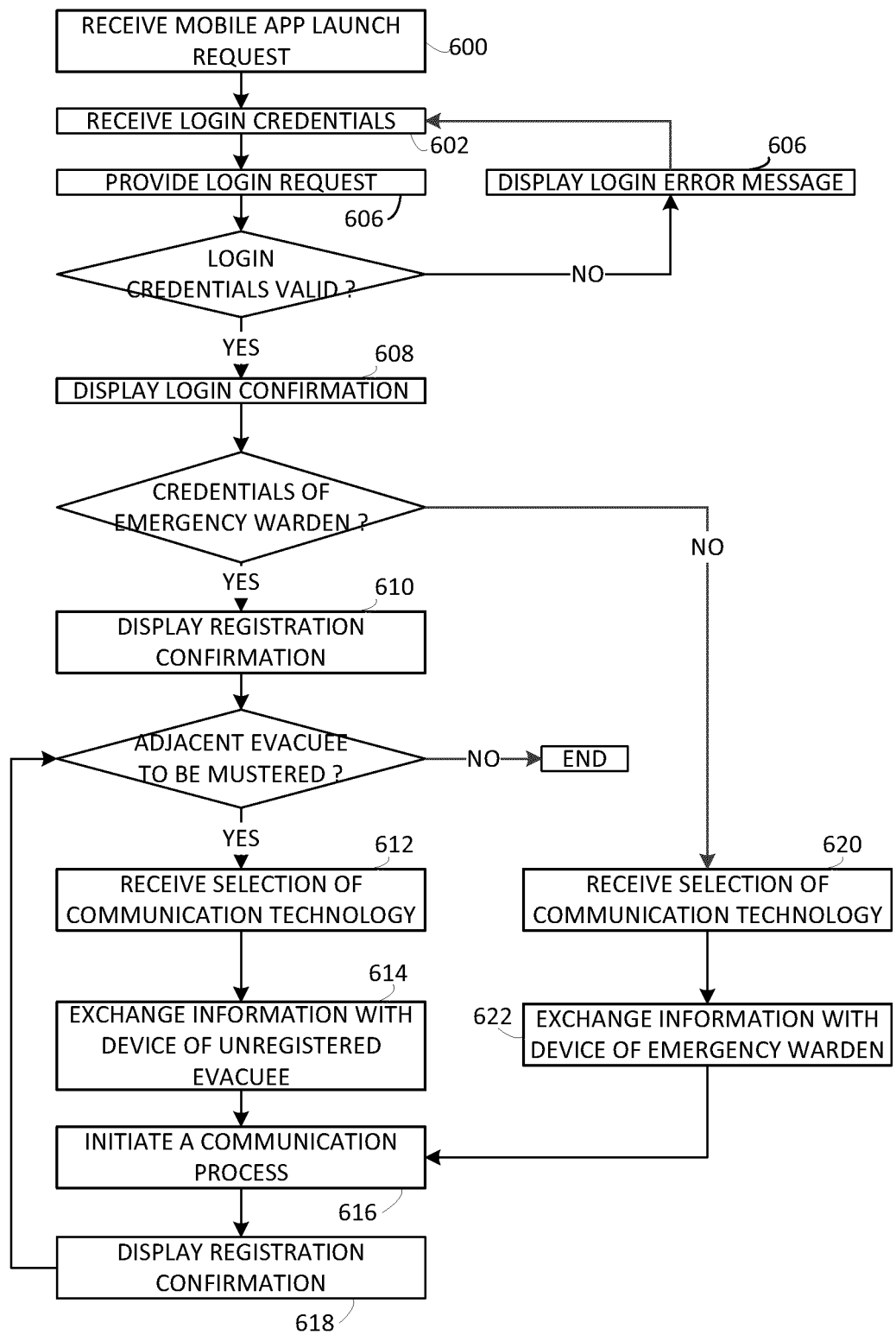
FIG. 6 is a flowchart illustrating the operation of a handheld computing device on which a mobile application is executed in identifying evacuees according to an embodiment of the invention.

An exemplary operation of the upstream device 306 and midstream device 308 in virally identifying evacuees is described herein below with reference to FIG. 3, FIG. 4, and FIG. 6, the latter presenting a flowchart of the operation. In a step 600, the upstream device 306 receives a request to launch the mobile application from the upstream evacuee. In some embodiments, the upstream evacuee submits the request by clicking or tapping an icon displayed on the screen of the upstream device 306. In other embodiments, the evacuee submits the request by issuing a voice command. In yet another embodiment, the evacuee submits the request by bringing the upstream device 306 in proximity with an RFID or NFC chip programmed specifically for this purpose and accessible at the muster point.

In a step 602, once the mobile application is launched, it requests and receives the login credentials of the upstream evacuee. The login credentials can, for instance, be requested and received through a touch screen of the upstream device 306. In another embodiment, the login credentials can be received through a physical keyboard of the upstream device 306. In yet another embodiment, the login credentials are received in the form of fingerprints by a fingerprint sensor of the upstream device 306 or in the form of ocular patterns captured by a camera of the upstream device 306.

In a step 604, the upstream device 306 provides a login request to the login module 424 over wired or wireless communication. The login request comprises the login credentials of the evacuee and the corresponding time and location stamps, both of which are generated by the upstream device 306. In one embodiment of the present invention, the upstream device 306 generates the location stamp using its Global Positioning System (GPS). In another embodiment, it generates the location stamp by signal triangulation.

In a step 606, if the login module 424 determined that the received login credentials are invalid, the upstream device 306 receives a login error message for display on its screen. In some embodiments, the login error message is generic, and in others, it provides a justification as to the failed login attempt. As a first example, the login error message can indicate that the username has been recognized and provide instructions to retrieve the forgotten password. As a second example, the error message can indicate that the username has not been recognized and provide instructions to retrieve the username. As a third example, the error message can indicate that the provided biometric data fail to meet predetermined standards.

In a step 608, if the login module 424 previously determined that the received login credentials are valid, the upstream device 306 receives from the login module 424 a login confirmation for display on its screen. The login confirmation informs the upstream evacuee that the login request has been successfully processed. In some embodiments, the login confirmation comprises a login timestamp generated by the login module 424. The login process provides for a more reliable mustering process as it decreases the likelihood that handheld computing devices such as the upstream device 306 are in the hands of anyone other than their rightful operators.

In a step 610, if the login module 424 determined that the login credentials are valid and belonged to a root emergency warden, the upstream device 306 is provided with a registration confirmation for display on its screen. The registration confirmation indicates that: the upstream evacuee has been identified before the central mustering server 300; the upstream device 306 has been enabled as a mobile mustering station; and the upstream evacuee can act as an emergency warden with respect to other evacuees. For the purposes of the description herein below, the upstream evacuee will act as an emergency warden with respect to the midstream evacuee.

In a step 612, the upstream device 306 receives from the upstream evacuee a selection of a communication technology to be used in transferring information to or from the midstream device 308. The selected communication technology is restricted to ranges no greater than five meters. According to one embodiment, the selected communication technology is restricted to ranges no greater than two meters. According to another embodiment, the selected communication technology is restricted to ranges no greater than one meter.

In a step 614, the upstream device 306 is brought within proximity of the midstream device 308 to enable the transfer of information over the selected communication technology. For instance, if the selected communication technology provides for information transfers over ranges no greater than one meter, the upstream device 306 is to be brought within a distance no greater than one meter from the midstream device 308. The information transfer consists in receiving the GUID of the midstream evacuee from the midstream device 308.

In a step 616, the previous information transfer initiates a communication process over the course of which the upstream device 306 submits a validation request to the validation module 426, which in turn determines whether the upstream evacuee is entitled to identify the midstream evacuee before the central mustering server 300 at the geographical location of the information transfer. If the validation module 426 determines that the upstream evacuee is not entitled to do so, it provides a validation error message to the upstream device 306 for display on its screen. Otherwise, the validation module 426 submits a profile request to the profile module 428, which in turn retrieves the midstream evacuee's profile and provides it to the upstream device 306 for display. After consulting the provided profile and recognizing that the midstream evacuee is indeed the person holding the midstream device 308, the upstream evacuee instructs the upstream device 306 to provide an ID confirmation to the registration module 430, which in turn generates and stores a registration timestamp within the store of mustering data 312 as associated with the midstream evacuee, whereby the midstream evacuee is identified before the central mustering server 300 and the midstream device 308 is enabled as a mobile mustering station.

In a step 618, the upstream device 306 receives a registration confirmation from the registration module 430 for display on its screen. The registration confirmation is provided for display on the upstream device 306 as a notification: that the midstream evacuee has been identified before the central mustering server 300; that the specific device 306 is enabled as a mobile mustering station; and that as an emergency warden, the midstream evacuee may now identify other evacuees before the central mustering server 300. In some embodiments, the registration confirmation comprises a registration timestamp generated by the registration module 430 over the course of the communication process.

It should be noted that while the steps 612 to 618 have been described as involving two handheld computing devices, one of which has been previously enabled as a mobile mustering station, they can alternatively involve a handheld computing device belonging to either one of an identified evacuee and an unidentified evacuee, and an identification badge bearing an identifier of the other, which identifier is readable by the handheld computing device, such as a smart card. This would prove practical for evacuees having none of their handheld computing devices. Identified evacuees can use their identification badges to identify other evacuees before the central mustering server 300. As a result, the viral identification of evacuees can be propagated not only by those of the evacuees having their handheld computing devices, but also by those having their identification badges.

It should be noted that while the steps 612 to 618 have been described as involving two handheld computing devices, one of which has been previously enabled as a mobile mustering station, they can alternatively involve no more than a handheld computing device belonging to either one of an identified evacuee and an unidentified evacuee, which would read information from the other in the form of biometric identifiers such as fingerprints or iris patterns. This would prove practical for evacuees having none of their handheld computing devices or identification badges. Identified evacuees can act as emergency wardens by submitting their biometric data through the handheld computing devices of unidentified evacuees, which would trigger a communication process by which the unidentified evacuees are identified before the central mustering server 300 and the handheld computing devices are enabled as mobile mustering stations. As a result, the viral identification of evacuees can also be propagated by those that have neither one of their handheld computing devices and identification badges.

It is also important to note that should an evacuee have no handheld computing devices or identification badges such as the smart card 332, the mobile application presents a manual entry feature that enables the emergency warden to request for an electronic form to be displayed on the screen of the mobile mustering station, which form can be filled out by either one of the emergency warden and the evacuee in instance of registration. In some embodiments, the manual entry of the identifier of the evacuee in instance of registration within the electronic form serves as the transfer of information that initiates a communication process by which the evacuee is to be identified before the store of mustering data 312.

If the login module 424 determined that the login credentials are not those of an emergency warden, the upstream evacuee can, for instance, interact with a mobile mustering station through the upstream device 306 in order to be identified before the central mustering server 300. In a step 620, the upstream device 306 receives from the upstream evacuee a selection of a communication technology to be used in transferring information to or from the mobile mustering station. In a step 622, the upstream device 306 is brought into proximity with the mobile mustering station for a transfer of information to take place using the selected communication technology. The information transfer consists in the transfer of the GUID of the upstream evacuee from the upstream device 308 to the mobile mustering station. The exchange of information initiates the communication process in the step 616, which leads to the identification of the upstream evacuee before the central mustering server 300 and the enablement of the upstream device 306 as a mobile mustering station. In the step 618, the upstream device 306 receives a registration confirmation for display on its screen.

The steps 612 to 618 can be performed recursively as other handheld computing devices become enabled as mobile mustering stations, which leads to a proliferation of mobile mustering stations across highly dense crowds. This provides for expeditious mustering in comparison with prior art solutions, which typically require that the dense crowds be organized into line-ups behind predetermined mustering stations. Also, use of short-range (e.g. RFID, NFC) rather than longer range (e.g. Wi-Fi, SMS) communication technologies for information transfers enable evacuees to establish a tighter human chain, which provides for greater reliability as it reduces the likelihood that occupants report themselves from the designated area and provides emergency wardens with the opportunity to visually recognize other evacuees before having them identified.

While in some embodiments, a same handheld computing device or identification badge can be used to identify an unlimited number of evacuees before the central mustering server 300, in other embodiments, it can be used to identify no more than a predetermined number of evacuees, thereby minimizing the likelihood that identified evacuees forget one or more of the unidentified evacuees for whom they acted as emergency wardens.

While the transfer of information between the upstream device 306 and the midstream device 308 has been described as consisting in the transfer of the GUID of the midstream evacuee from the latter device to the former, it can alternatively consist in transfers of other types of information, or transfers directed from the former device to the latter. For instance, according to one embodiment, the transfer of information consists in the transfer of the emergency GUID from the upstream device 306 to the midstream device 308.

While the communication process initiated by the information transfer has been described as the series of communications between the upstream device 306, the store of mustering data 312, the validation module 426, the profile module 428, and the registration module 430, it can alternatively consist in a different series of communications. For instance, the communication process can consist in a transfer of a GUID of the midstream evacuee from the midstream device 308 to the registration module 430.

The communication process has been described as providing measures to reduce the likelihood of false reports such as the requirement that the emergency warden be logged into the central mustering server 300 as well as the requirement that the emergency warden confirm the identity of the evacuee prior to identifying the evacuee before the central mustering server 300. However, in other embodiments, the communication process is streamlined by dispensing with such measures.

While the central mustering server 300 has been described as retrieving the muster list from the access control system 304, it can alternatively, be generated from one or more data sources comprising: presence registers kept by the covered area's operator; ad-hoc sweeps of the covered area prior to the emergency via communication technologies such as Bluetooth™ or RFID; access control systems; and devices interfacing with access control systems.

While the method of virally identifying evacuees at a muster point has been described as initiated by predetermined emergency wardens, it can alternatively be initiated by ad-hoc emergency wardens, in which case the central mustering server 300 would not comprise the warden control module 316 and the content of the store of mustering data 312 would not include the names of predetermined emergency wardens. For instance, in some embodiments, each one of the muster points is equipped with a stationary mustering station, which can be in the form of a visible and accessible RFID chip mounted on a stationary structure. In the absence of emergency wardens at the muster point, an evacuee can identify himself before the central mustering server 300 using the stationary mustering station, at which point he becomes deputized as an emergency warden, and initiate the method of virally identifying evacuees at the muster point.

The invention has been described within the context of an evacuation to a plurality of muster points. The scattering of evacuees across multiple locations is in some cases required, if only to comply with jurisdictional regulations, and in others, desirable, especially if no single location within the immediate surroundings of the designated area is of sufficient capacity to accommodate the area's occupants. Nevertheless, the invention can be applied within the context of an evacuation that calls for no more than one muster point, in which case all evacuees would meet at a same, predetermined location. In the latter context, the validation module 426 would not have to be configured to verify whether the received GUIDs are associated with persons sharing a common muster point.

Figure 7:
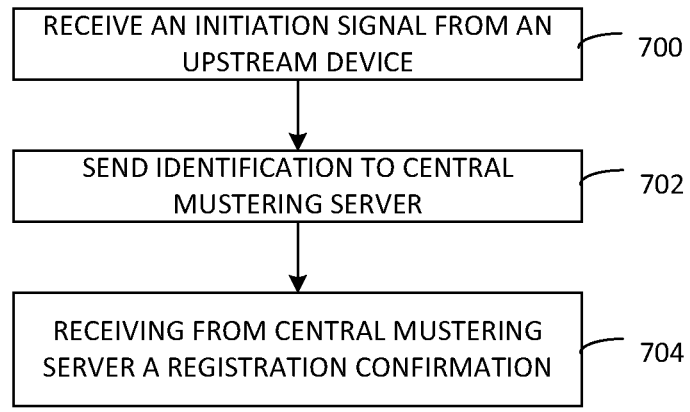
FIG. 7 is a flowchart illustrating the operation of the handheld computing device on which the mobile application is executed in conducting a first transfer of information with an emergency warden and initiating a first communication process over the course of which it provides to the central mustering an identifier of the evacuee to whom the handheld computing device belongs according to an embodiment of the invention.
Figure 9:
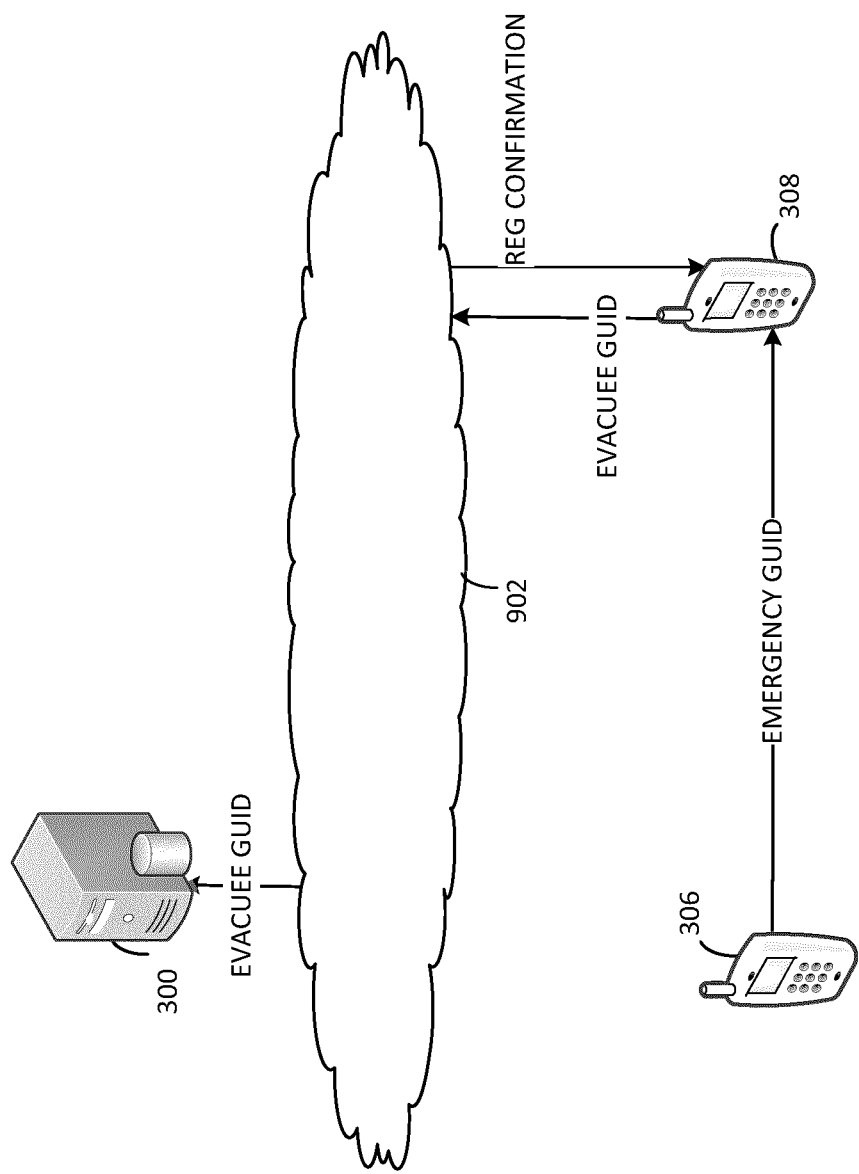
FIG. 9 is a schematic block diagram illustrating the central mustering server, the handheld computing device of an identified evacuee, and the handheld computing device of an evacuee in instance of identification communicating with one another according to flowchart shown in FIG. 7.

In the described embodiments, the midstream device 308 provides the GUID of the midstream evacuee, who is in instance of registration, to the upstream device 306, which had been previously enabled as a mobile mustering station, and the upstream device 306 provides the received GUID to the central mustering server 300. However, the GUID of the midstream evacuee can be transferred from the midstream device 308 to the central mustering server 300 through different paths. For instance, in one embodiment, the midstream device 308 transfers the GUID directly to the central mustering server 300 over the Internet or a local area network. Referring now to FIG. 9, there are shown the upstream device 306, the midstream device 308, and the central mustering server 300, wherein the midstream device 308 transfers the GUID of the midstream evacuee directly to the central mustering server 300. This particular communication path is reflected in the flowchart presented in FIG. 7, which illustrates the transfers of information between the upstream device 306, enabled as a mobile mustering station, the midstream device 308 of the midstream evacuee in instance of registration, and the central mustering server 300. In a step 700, the midstream device 308 receives an initiation signal from the upstream device 306 such as, for instance, the emergency GUID, in response to which in a step 702, the midstream device 308 provides the GUID of the midstream evacuee to the central mustering server 300. In return, in a step 804, the midstream device 308 receives from the central mustering server 300 a registration confirmation for display on its screen, which confirmation notifies the midstream evacuee that: the midstream evacuee is identified before the central mustering server 300; and the midstream device 308 is enabled as a mobile mustering station.

Figure 8:
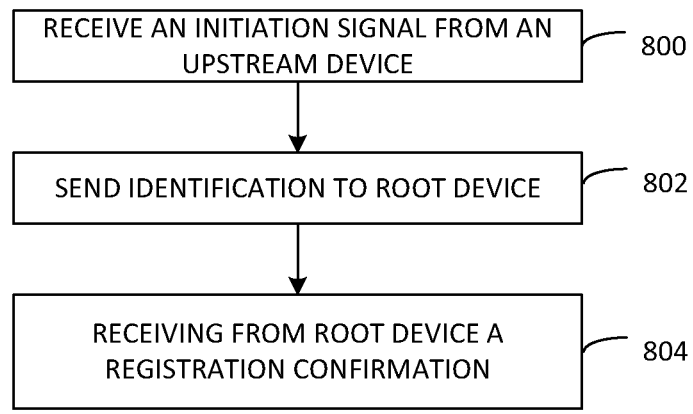
FIG. 8 is a is a flowchart illustrating the operation of the handheld computing device on which the mobile application is executed in conducting a first transfer of information with an emergency warden and initiating a first communication process over the course of which it provides to the root emergency warden an identifier of the evacuee to whom the handheld computing device belongs according to another embodiment of the invention.
Figure 10:
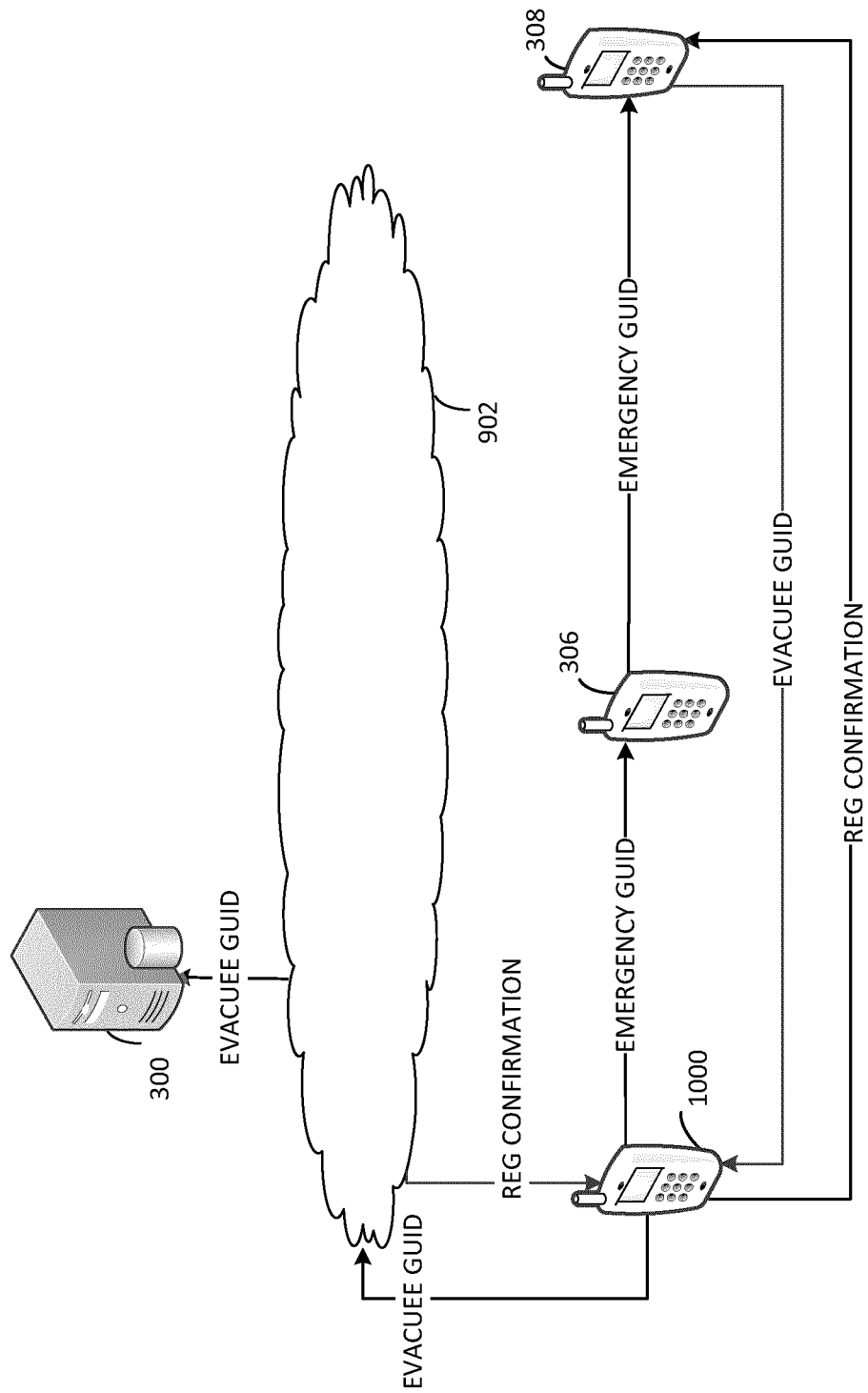
FIG. 10 is a schematic block diagram illustrating the central mustering server, the handheld computing device of a root emergency warden, the handheld computing device of an identified evacuee, and the handheld computing device of an evacuee in instance of identification communicating with one another according to the flowchart shown in FIG. 8.

In another embodiment, the midstream device 308 transfers the GUID of the midstream evacuee directly to the root mobile mustering station, namely the mobile mustering station that initiated the viral identification of evacuees at the mustering point. In turn, the root mobile mustering station provides the received GUID to the central mustering server 300. In the latter embodiment, the midstream device 308 can, for instance, transfer the GUID of the midstream evacuee to the root mobile mustering station over SMS technology. Referring now to FIG. 10, there are shown the upstream device 306, the midstream device 308, a root mobile mustering station 1000, and the central mustering server 300, wherein the midstream device 308 transfers the midstream evacuee's GUID directly to the root mobile mustering station 1000. This particular communication path is reflected in the flowchart presented in FIG. 8, which illustrates the exchange of information between the upstream device 306, enabled as a mobile mustering station, the midstream device 308, and the root mobile mustering station 1000. In a step 800, the midstream device 308 receives an initiation signal from the upstream device 306 such as, for instance, the emergency GUID, in response to which in a step 802, the midstream device 308 provides the GUID of the midstream evacuee to the root mobile mustering station 1000 through, for instance SMS messaging. In return, in a step 804, the midstream device 308 receives from the root emergency warden 900 a registration confirmation for display on its screen, which confirmation notifies the midstream evacuee that: the midstream evacuee is identified before the central mustering server 300; and the midstream device 308 is enabled as a mobile mustering station.

Figure 11:
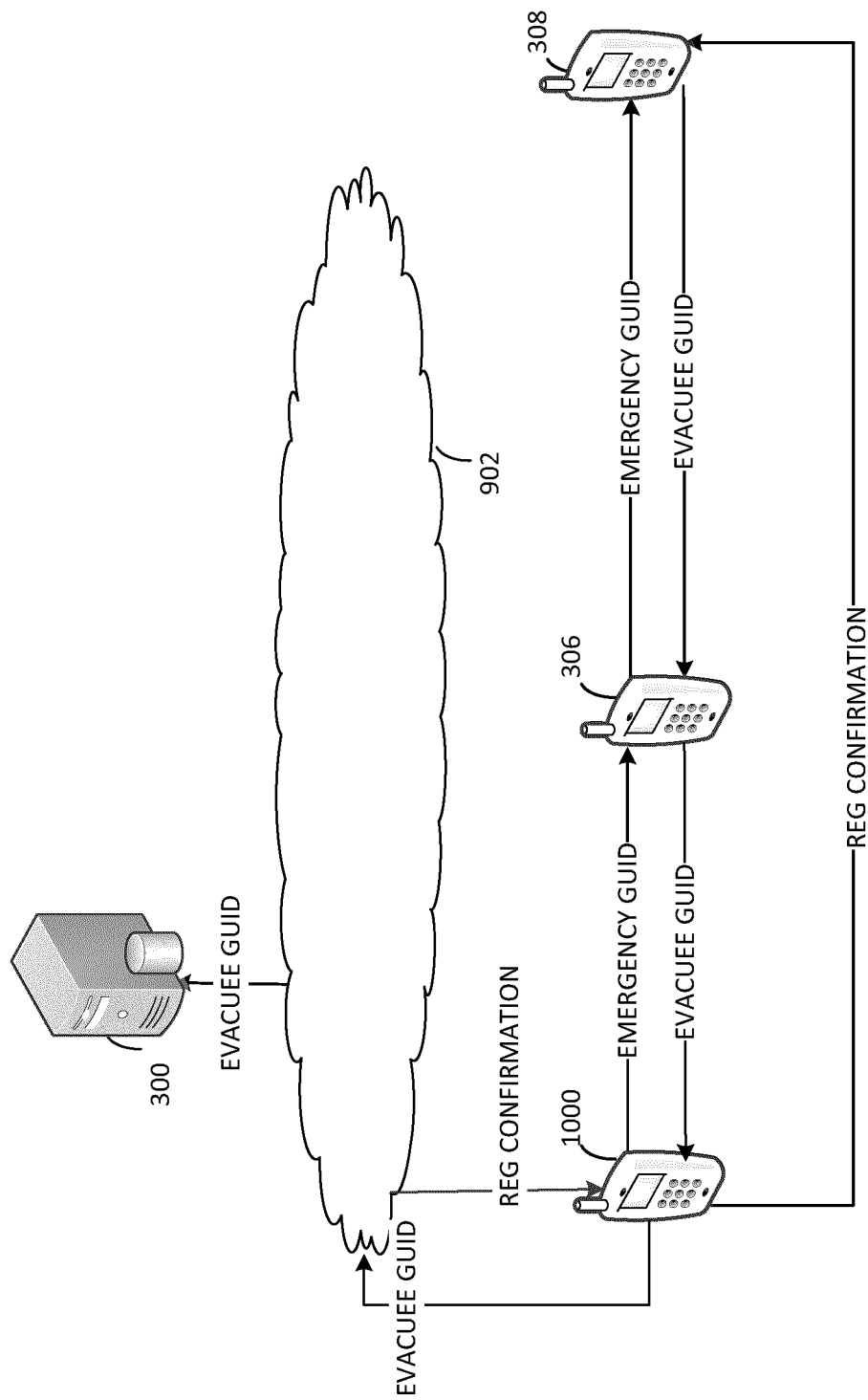
FIG. 11 is a schematic block diagram illustrating the devices shown in FIG. 10 communicating with one another to identify the evacuee in instance of identification before the central mustering server according to a hierarchical reporting scheme.

In yet another embodiment, the midstream device 308 does not transfer the GUID of the midstream evacuee directly to the root mobile mustering station 1000, but rather by a sequence of upstream transfers that reaches the root mobile mustering station 1000, which in turn transfers the received GUID to the central mustering server 300. In the latter embodiment, the upstream transfers can, for instance, take place over an ad-hoc Bluetooth™ network created over the course of the viral proliferation of mobile mustering stations. Referring now to FIG. 11, there are shown the upstream device 306, the midstream device 308, a root mobile mustering station 1000, and the central mustering server 300, wherein the midstream device 308 transfers the GUID of the midstream evacuee to the upstream device 306, which in turn transfers the same to the root mobile mustering station 1000.

While the ID confirmation has been described as comprising the GUID of the upstream evacuee as well as the GUID of the midstream evacuee, it can also comprise other data such as a photograph and health status of the midstream evacuee as provided by the upstream evacuee. The health status can, for instance, be in the form of a numerical value on a scale from 1 to 5, where 1 can mean healthy, 5 can mean unconscious or dead, and mid-values indicate various degrees of injuries according to a pre-established definition customized to each site's characteristics and requirements. The registration module 430 stores the photograph and health status as associated with the midstream evacuee within the store of mustering data 312. The mustered persons report generator 320 produces reports incorporating the stored photograph and health status.

While data transfers between the central mustering server 300 and the handheld computing devices have been described as taking place over networks based on longer-range technologies such as Wi-Fi, they can alternatively take place over technologies such as Bluetooth™ and NFC. In some embodiments, the server program is executed on the handheld computing device of the root emergency warden for enablement as the central mustering server 300. At the muster point, the handheld computing device of the root emergency warden communicates with the handheld computing devices of the other evacuees as the central mustering server 300. It does so over an ad-hoc network created over the course of the viral proliferation of mobile mustering stations and based on technologies such as Bluetooth™ and NFC. The root emergency warden provides a copy of the compiled information to the search and rescue services upon their arrival. This is particularly useful in environments less suited for longer-range technologies such as oil facilities in war zones, where a minimum network infrastructure (antennas, routing devices, etc.) cannot be easily installed and maintained operational on site.

Figure 12:
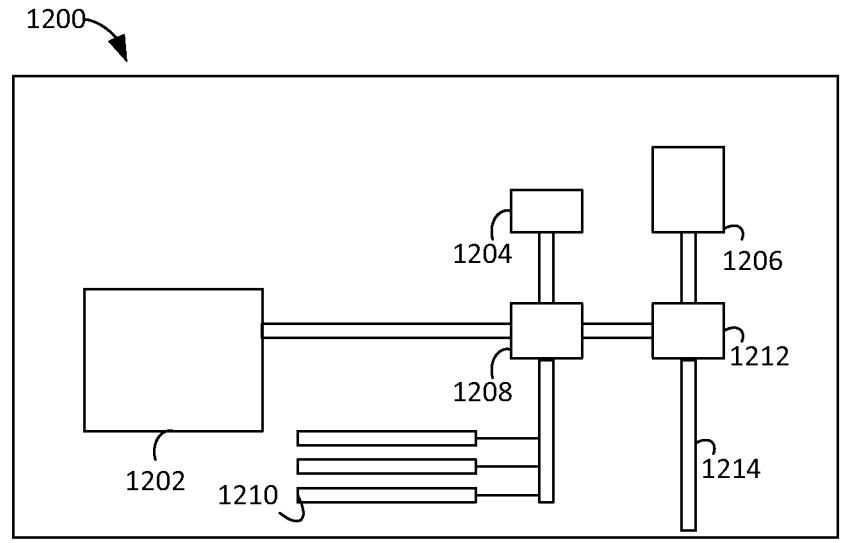
FIG. 12 is a schematic block diagram of a server and a handheld computing device.
Figure 12:
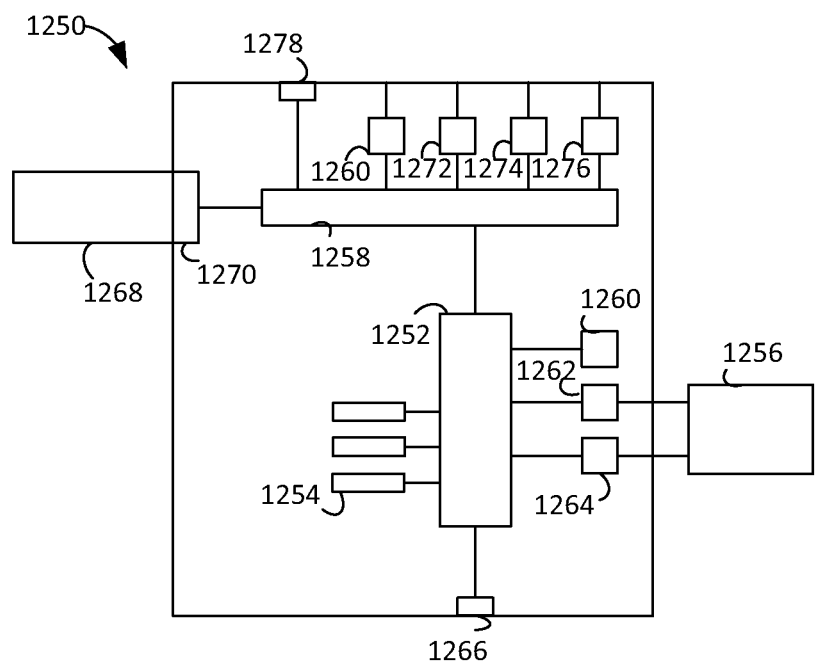

FIG. 12 shows an example of a server 1200 and a handheld computing device 1250, which may be used to implement the processes described herein. The server 1200 is intended to represent various forms of servers. The handheld computing device 1250 is intended to represent various forms of devices such as personal digital assistants, cellular telephones, smartphones, and other similar computing devices. The components shown here, their connections, their relationships, and their functions, are meant to be exemplary only, and are not meant to limit implementations of the present invention. For the purposes of clarity, the server program can, for instance, be executed on either one of the server 1200 and the handheld computing device 1250 to enable the corresponding device as the central mustering server 300.

The server 1200 has a processor 1202, memory 1204, a storage device 1206, a high-speed interface 1208, high-speed expansion ports 1210, a low speed interface 1212, and a low speed bus 1214 interconnected using various busses and mounted on a common motherboard. The processor 1202 can process instructions for execution within the server 1200, including instructions stored in the memory 1204 or on the storage device 1206 to display graphical information for a GUI on an external input/output device, such as a display coupled to the high-speed interface 1208. In other implementations, multiple processors and multiple busses may be used as appropriate, along with multiple memories of different types. Also, the server 1200 may comprise multiple servers connected with one another and dedicated to a subset of the operations. In some embodiments, the server 1200 is located in a cloud platform such as Microsoft Azure™.

The memory 1204 can be volatile or non-volatile. The storage device 1206 is capable of providing mass storage for the server 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network. A computer program can be tangibly embodied in an information carrier and contain instructions which, when executed, perform one or more methods, such as those described above. The information carrier may be a non-transitory computer-readable or machine-readable storage medium, such as the memory 1204, the storage device 1206, or memory in the processor 1202.

The high-speed controller 1208 manages bandwidth-intensive operations for the server 1200, while the low-speed controller 1212 manages lower bandwidth-intensive operations. In one implementation, the high-speed controller 1208 is coupled to the memory 1204, to the display through, for instance, a graphics processor or accelerator, and to the high-speed expansion ports 1210, which may accept various expansion cards. The low-speed controller 1212 is coupled to the storage device 1206 and low-speed expansion port 1210. The low-speed expansion port 1212, which may include various communication ports such as ones configured for USB, Bluetooth™, Ethernet, and wireless Ethernet communications, may be coupled to one or more input/ output devices, such as a keyboard, a pointing device, a scanner, and a networking device such as a switch or router through a network adapter.

The handheld computing device 1250 includes a processor 1252, memory 1254, a display 1256, a communication interface 1258, a transceiver 1260 among other components, interconnected using various busses and mounted on a common motherboard. The handheld computing device 1250 can also have a storage device, such as a micro-drive or other device, to provide additional storage.

The processor 1252 is configured to execute instructions stored in the memory 1254. It can be implemented as a single chip, or alternatively, as a chipset that includes separate and multiple analog and digital processors. The processor 1252 may provide, for example, for coordination of the other components of the handheld computing device 1250, such as control of user interfaces, applications run by the handheld computing device 1250 and wireless communication by the handheld computing device 1250.

The processor 1252 may communicate with a user through a control interface 1262 and a display interface 1264 coupled to the display 1256. The display 1256 may be a TFT LCD (Thin-Film-Transistor Liquid Crystal Display), an OLED (Organic Light Emitting Diode) display, or any other appropriate display technology. The display interface 1264 may comprise appropriate circuitry for driving the display 1256 to present graphical information to a user. The control interface 1262 may receive commands from a user and convert them for submission to the processor 1252. In addition, an external interface 1266 may be provided in communication with the processor 1252, so as to enable near field communication of the handheld computing device 1250 with other devices. The external interface 1266 may provide, for example, for wired communication in some implementations, or for wireless communication in other implementations, and multiple interfaces may also be used.

The memory 1254 stores information within the handheld computing device 1250. It can be implemented as one or more of a computer-readable medium or media, a volatile memory unit or units, or a non-volatile memory unit or units. Expansion memory 1268 may also be provided and connected to the handheld computing device 1250 through an expansion interface 1270, which may include, for example, a SIMM (Single In Line Memory Module) card interface. The expansion memory 1268 may provide extra storage space for the handheld computing device 1250, or may also store applications or other information for the handheld computing device 1250. Specifically, the expansion memory 1268 may include instructions to carry out or supplement the processes described above, and may include secure information also. Thus, for example, the expansion memory 1268 may be provided as a security module for the handheld computing device 1250 and may be programmed with instructions that permit secure use of the handheld computing device 1250. In addition, secure applications may be provided via the SIMM cards, along with additional information, such as placing identifying information on the SIMM card in a secure manner.

The memory may include, for example, flash memory and/or NVRAM memory, as discussed below. In one implementation, a computer program product is tangibly embodied in an information carrier. The computer program product contains instructions that, when executed, perform one or more methods, such as those described herein below. The information carrier is a computer-readable medium or machine-readable medium, such as the memory 1254, the expansion memory 1268, memory embedded in the processor 1252, or a propagated signal that may be received, for example, over the transceiver 1260 or the external interface 1266.

The handheld computing device 1250 may communicate wirelessly through the communication interface 1258, which may include digital signal processing circuitry where necessary. The communication interface 1258 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through the transceiver 1260. Also, communication may occur through a Bluetooth™ transceiver 1272, a Wi-Fi transceiver 1274, an NFC transceiver 1276, or other such transceivers. In addition, a GPS (Global Positioning System) receiver module 1278 may provide additional navigation-related and location-related wireless data to the handheld computing device 1250, which may be used as appropriate by mobile applications running on the handheld computing device 1250.

The handheld computing device 1250 may also communicate audibly using an audio codec 1280, which may receive spoken information from a user and convert it to usable digital information. The audio codec 1280 may likewise generate audible sounds for a user through, for instance, a speaker of the handheld computing device 1250. Such sounds may include sounds generated during telephone calls, recorded sounds (e.g. voice messages and music files), as well as sounds generated by mobile applications running on the handheld computing device 1250.

What is claimed is:

1. A method of identifying evacuees from a list of evacuees at a muster point within a context of an emergency evacuation using a central mustering server, a first entity designated as an emergency warden and a second entity designated as a midstream evacuee of said evacuees on said list of evacuees, said method comprising:
    a) bringing said second entity in proximity with said first entity;
    b) performing a first electronic exchange of information between said second entity and one of said first entity and said central mustering server to identify said midstream evacuee before said central mustering server as an additional emergency warden with respect to a plurality of third entities being any other ones of said evacuees on said list of evacuees;
    c) bringing said second entity in proximity with said third entity;
    d) performing a second electronic exchange of information between said second entity and one of said third entity and said central mustering server to identify said third entity before said central mustering server as an additional emergency warden with respect to a further entity being any other one of said evacuees on said list of evacuees; and
    e) repeating steps (c) and (d) to identify further remaining members of the list of evacuees.

2. The method of claim 1 further comprising displaying a confirmation at said second entity of said performing said first electronic exchange of information.

3. The method of claim 1 wherein performing any one of said first electronic exchange of information or said second electronic exchange of information comprises establishing a Near-Field Communication (NFC) connection.

4. The method of claim 1 wherein said second entity communicates with said central mustering server to identify said third entity before said central mustering server as an additional emergency warden.

5. The method of claim 4 further comprising displaying a profile of said one of said evacuees associated with said third entity at a device associated with said second entity and receiving a confirmation from said second entity acting as said emergency warden that said profile matches said evacuee associated with said third entity.

6. The method of claim 1 wherein any one of said first electronic exchange of information or said second electronic exchange of information between said second entity and said central mustering server is performed over a local area network.

7. The method of claim 1 wherein any one of said first electronic exchange of information or said second electronic exchange of information between said second entity and said central mustering server is performed over Short Message Service (SMS) communication.

8. The method of claim 1 wherein any one of said performing said first electronic exchange of information or said second electronic exchange of information comprises receiving login credentials, and validating said login credentials.

9. The method of claim 1 further comprising:
receiving instructions from said second entity to display an electronic form on a handheld computing device used by said second entity for manual entry of an identifier of one of said evacuees;
displaying said electronic form on said handheld computing device;
receiving said manual entry through said electronic form; and
providing said manually entered identifier to said central mustering server.

10. The method of claim 1 further comprising determining a geographical location where said first electronic exchange of information or said second exchange of information took place and providing said geographical location to said central mustering server.

11. The method of claim 10 wherein said determining said geographical location is performed using a Global Positioning System (GPS).

12. A non-transitory computer readable medium comprising a mobile application to be executed within a context of an emergency evacuation at a muster point by evacuees on a list of evacuees on respective handheld computing devices, said mobile application, when executed by a midstream one of said evacuees on said list of evacuees on a midstream one of said handheld computing devices, causes a processor, of said midstream one of said handheld computing devices, to:
conduct a first transfer of information with an emergency warden to enable a first communication process by which said midstream evacuee is identified before a central mustering server, said first transfer of information being enabled by bringing said midstream evacuee and said emergency warden in close proximity with one another;
conduct a second transfer of information with any downstream one of said evacuees on said list of evacuees after said midstream evacuee is identified before said central mustering server to enable a second communication process by which said downstream evacuee is identified before said central mustering server, said second transfer of information being enabled by bringing said midstream evacuee and said downstream evacuee in close proximity with one another; and
initiate at least one of said enabled first communication process and said enabled second communication process, wherein said midstream one of said handheld computing devices is operative to facilitate a plurality of said downstream evacuees to be identified before said central mustering server as an additional emergency warden with respect to a further entity being any other one of said evacuees on said list of evacuees.

13. The non-transitory computer readable medium of claim 12 wherein said processor is caused to establish a Near-Field Communication (NFC) connection with an NFC chip, and one of said first transfer of information and said second transfer of information is performed over said NFC connection.

14. The non-transitory computer readable medium of claim 12 wherein said processor is caused to receive an identifier of said downstream evacuee, and during said second communication process, provide said received identifier to said central mustering server.

15. A mustering system comprising:
a first non-transitory computer readable medium coupled in signal combination with a second non-transitory computer readable medium configured for use in an emergency evacuation,
the first non-transitory computer readable medium comprising a mobile application to be executed within a context of an emergency evacuation at a muster point by evacuees on respective handheld computing devices, said mobile application, when executed by a midstream one of said evacuees on a midstream one of said handheld computing devices, causes a processor, of said midstream one of said handheld computing devices, to:
conduct a first transfer of information with an emergency warden to enable a first communication process by which said midstream evacuee is identified before a central mustering server, said first transfer of information being enabled by bringing said midstream evacuee and said emergency warden in close proximity with one another;
conduct a second transfer of information with any downstream one of said evacuees on said list of evacuees after said midstream evacuee is identified before said central mustering server to enable a second communication process by which said downstream evacuee is identified before said central mustering server, said second transfer of information being enabled by bringing said midstream evacuee and said downstream evacuee in close proximity with one another;
initiate at least one of said enabled first communication process and said enabled second communication process; and
the second non-transitory computer readable medium comprising software to be executed on a server, said software, when executed on said server, enables said server as a new central mustering server and causes said new central mustering server processor to produce a list of missing persons for search and rescue services by removing said midstream evacuee and said downstream evacuee from a list of persons to be mustered that are identified before said central mustering server, wherein said midstream one of said handheld computing devices is operative to facilitate a plurality of said downstream evacuees to be identified before said central mustering server as an additional emergency warden with respect to a further entity being any other one of said evacuees on said list of evacuees.

16. The mustering system of claim 15 wherein said server processor is further caused to retrieve said list of persons to be mustered from an Access Control System of an area being evacuated.

17. The mustering system of claim 15 wherein said server processor is caused to receive an activation signal from an alarm system covering an area when said alarm system is triggered, and retrieve said list of persons to be mustered in response to said activation signal.

18. The method of claim 1 wherein performing any one of said first electronic exchange of information or said second electronic exchange of information comprises using at said second entity one of displaying an identifier code and capturing a displayed identifier code.

19. The non-transitory computer readable medium of claim 12 wherein said processor is further caused to display an identifier code and/or to capture a displayed identifier code.

20. The mustering system of claim 15 wherein said first non-transitory medium further causes said midstream one of said handheld computing device's processor to display an identifier code and/or to capture a displayed identifier code.

\* \* \* \* \*